(12) United States Patent
Goto et al.

(10) Patent No.: US 11,459,250 B2
(45) Date of Patent: Oct. 4, 2022

(54) TREATMENT METHOD FOR ORGANIC WASTEWATER AND USE OF SAME

(71) Applicant: HYMO Corporation, Tokyo (JP)

(72) Inventors: Hisanori Goto, Tokyo (JP); Takayuki Kobayashi, Tokyo (JP)

(73) Assignee: HYMO Corporation, Tokyo (JP)

( * ) Notice: Subject to any disclaimer, the term of this patent is extended or adjusted under 35 U.S.C. 154(b) by 248 days.

(21) Appl. No.: 16/659,946

(22) Filed: Oct. 22, 2019

(65) Prior Publication Data

US 2020/0048115 A1     Feb. 13, 2020

Related U.S. Application Data

(63) Continuation of application No. PCT/JP2018/017321, filed on Apr. 27, 2018.

(30) Foreign Application Priority Data

Apr. 28, 2017    (JP) .............................. JP2017-090753

(51) Int. Cl.
    *C02F 1/54*       (2006.01)
    *C02F 1/52*       (2006.01)
    (Continued)

(52) U.S. Cl.
    CPC ............ *C02F 1/547* (2013.01); *C02F 1/5272* (2013.01); *C05B 15/00* (2013.01); *C08L 33/14* (2013.01);
    (Continued)

(58) Field of Classification Search
    None
    See application file for complete search history.

(56) References Cited

U.S. PATENT DOCUMENTS 4,038,180 A * 7/1977 Talbert .................... C02F 1/048
                                                                  210/711
2007/0187333 A1* 8/2007 Whittaker ................ C02F 1/56
                                                                  210/723
(Continued)

FOREIGN PATENT DOCUMENTS

JP       H05-345195 A     12/1993
JP       2000-126800 A    5/2000
(Continued)

OTHER PUBLICATIONS

Painter et al. (Journal of Biochemical and Microbiological Technology and Engineering, 1959, 1, 143-162). (Year: 1959).*
(Continued)

*Primary Examiner* — Clare M Perrin
(74) *Attorney, Agent, or Firm* — Morgan, Lewis & Bockius LLP

(57) ABSTRACT

The purpose of the present invention is to provide a treatment method by which, even for wastewater with organic constituents constituting a large portion of organic wastewater as a whole and suspended solids (SS) and with a large negative charge ratio, organic nitrogen constituents and phosphorus compounds can be efficiently separated and collected and good-quality separated water can be obtained by reducing the quantity of SS, BOD, COD, and nitrogen constituents in the separated water. Provided is a treatment method for organic waste water, in which a flock is formed by adding a polymer flocculant to organic waste water with organic nitrogen constituent content in relation to suspended solids (SS) being 4-50%/SS and organic nitrogen constituent content being 250-50,000 mg/L, and thereafter, the flock is separated from the organic wastewater by solid-liquid separation.

10 Claims, 2 Drawing Sheets

(51) Int. Cl.
*C05B 15/00* (2006.01)
*C08L 33/14* (2006.01)
*C08L 45/00* (2006.01)
*A23K 20/26* (2016.01)
*C02F 101/10* (2006.01)
*C02F 101/38* (2006.01)

(52) U.S. Cl.
CPC .............. *C08L 45/00* (2013.01); *A23K 20/26* (2016.05); *C02F 2101/105* (2013.01); *C02F 2101/38* (2013.01)

(56) References Cited

U.S. PATENT DOCUMENTS

| | | | |
|---|---|---|---|
| 2013/0105401 A1* | 5/2013 | Suh | C02F 1/5236 210/716 |
| 2015/0175457 A1* | 6/2015 | Oberholster | C02F 3/322 210/602 |
| 2018/0155224 A1 | 6/2018 | Gotou et al. | |
| 2018/0319683 A1 | 11/2018 | Gotou et al. | |

FOREIGN PATENT DOCUMENTS

| | | |
|---|---|---|
| JP | 2001-129590 A | 5/2001 |
| JP | 2003-062578 A | 3/2003 |
| JP | 2006297229 A * | 11/2006 |
| JP | 2009-214069 A | 9/2009 |
| JP | 2013-006159 A | 1/2013 |
| JP | 2014-155898 A | 8/2014 |
| WO | 2016/190388 A1 | 12/2016 |
| WO | 2017/073209 A1 | 5/2017 |

OTHER PUBLICATIONS

Machine translation of JP-2006297229-A, pp. 1-6. (Year: 2006).*
Nielfa et al. (Waste Management & Research, 2015, 33, 241-249). (Year: 2015).*
International Search Report (with partial translation) dated Jun. 5, 2018, issued in corresponding International Patent Application No. PCT/JP2018/017321.
English Translation of International Preliminary Report on Patentability dated Oct. 29, 2019, issued in corresponding International Patent Application No. PCT/JP2018/017321.
Office Action dated Jun. 7, 2022, issued in corresponding Japanese Patent Application No. 2019-514687.

* cited by examiner

ТREATMENT METHOD FOR ORGANIC WASTEWATER AND USE OF SAME

TECHNICAL FIELD

One aspect of the present invention relates to a treatment method for organic wastewater and use of the same, and for example, relates to a treatment method for efficiently clarifying organic wastewater. More specifically, one aspect of the invention relates to a treatment method for organic wastewater in which not only an organic substance in organic wastewater but also an organic body nitrogen component is contained in a coagulation flock as a solid content, efficient separation and recovery are performed, and BOD, COD, and a nitrogen component in the separated water are greatly reduced, and thus, separated water of high water quality can be obtained.

BACKGROUND ART

Examples of a treatment method for organic wastewater include an activated sludge method. The activated sludge method is a method of obtaining high-quality separated water by aerating an activated sludge, by decomposing a contamination substance in the microbe sludge in an aerobic condition, and by suitably managing a contamination substance concentration and an aeration amount. The activated sludge method is widely used in a clarified treatment of sewage, organic wastewater that is discharged from a factory, and the like.

In the activated sludge method, a removing effect of BOD contained in the organic wastewater is high, but a removing effect of a nitrogen compound and a phosphorus compound is low. In addition, it takes time to performing the treatment, a facility cost is also expensive, and a large installation area and a large installation space are required.

In livestock-based organic wastewater that contains a large amount of excrement, and organic wastewater that is discharged from a large-scale factory, a load to be applied to a treatment facility sharply fluctuates. For this reason, an operating condition for normally operating the treatment facility is complicated, and maintenance is difficult and requires a great effort. In addition, in most of the livestock-based organic wastewater, BOD, COD, and the content of the nitrogen component in the wastewater are high, and thus, an increase in an operating cost of the treatment facility due to an increase in a treatment time and an increase in the volume of an aeration bath is regarded as a problem.

On the other hand, a nutrient component such as an organic body nitrogen component such as a protein, or a phosphorus compound is contained in the organic wastewater. Such a nutrient component has attracted attention as a valuable resource that can be effectively used as a fodder for rearing animals or reuse of the fodder as a raw material thereof, and as an organic fertilizer, a farmyard compost or a raw material thereof, and the like for plants such as food-producing trees and crops.

In the treatment method of the related art, the organic body nitrogen component is decomposed to an ammonia body nitrogen component by a biological treatment such as the activated sludge method or an anaerobic digestion method, and after that, is further decomposed to nitrogen gas by a step such as a nitrification treatment or a denitrification treatment. For this reason, in the organic wastewater containing a large amount of organic body nitrogen component, various treatment steps are necessary, and thus, a necessary treatment cost increases. In addition, the organic body nitrogen component is discharged as the nitrogen gas, and thus, is not capable of being effectively reused.

In a case where such an organic body nitrogen component is used by being separated and purified from the organic wastewater, a method of separating the organic body nitrogen component as a solid content by performing a coagulation and condensation treatment is effective. However, most of the organic body nitrogen component in the organic wastewater has low coagulation properties, and thus, it is difficult to insolubilize and recover the organic body nitrogen component. In addition, the coagulation properties of the organic body nitrogen component are easily inhibited by the influence of a minus charge component other than the organic body nitrogen component contained in the wastewater, and thus, a complicated treatment is necessary for recovering the organic body nitrogen component.

A method of performing a dewatered treatment by adding and mixing a polymer coagulant into an organic sludge generated from a wastewater treatment such as the activated sludge method, and by coagulating an organic substance in the sludge is described in Patent Documents 1, 2, and 3. An object of any of Patent Documents 1, 2, and 3 is to improve reactivity with respect to the organic substance, and to improve an efficiency of solid-liquid separation by using a combination of various medical agents in the dewatered treatment of the sludge.

CITATION LIST

Patent Document

Patent Document 1: Japanese Unexamined Patent Application Publication "JP 2000-126800 A"
Patent Document 2: Japanese Unexamined Patent Application Publication "JP 2013-6159 A"
Patent Document 3: Japanese Unexamined Patent Application Publication "JP 2014-155898 A"

SUMMARY OF THE INVENTION

Problem to be Solved by the Invention

The treatment method for organic wastewater of the related art requires a complicated pre-treatment with respect to the wastewater, and requires an effort and a treatment cost. In addition, in the organic wastewater in which a ratio of the organic body nitrogen component to the organic wastewater and a suspended solid (hereinafter, referred to as "SS") is high, and a large amount of minus charge component is contained, the same effect as that in the case of the sludge is not obtained, and thus, a recovery rate of the organic body nitrogen component and the phosphorus compound is low, and SS, BOD, COD, and the nitrogen component in the organic wastewater are not reduced. In addition, the invention described in Patent Documents 1, 2, and 3 relates to the treatment method of the sludge, and a technology for making the treatment of the organic wastewater itself efficient is not described.

In addition, in the treatment method for organic wastewater of the related art such as the activated sludge method, a large amount of additive substance such as an inorganic coagulant is used in a pre-treatment step, and thus, when a solid matter recovered thereafter is used as a fertilizer or a fodder, there is a concern that the growth of plants or the body of livestock is negatively affected, and therefore, the treatment method for organic wastewater of the related art is not a preferred treatment method.

The invention has been made in consideration of such problems described above, and a main object thereof is to provide a treatment method in which an organic body nitrogen component and a phosphorus compound can be efficiently separated and recovered even in the case of wastewater in which an organic body nitrogen component in SS is high, and the organic body nitrogen component in whole organic wastewater is high, and high-quality separated water can be obtained by reducing SS, BOD, COD, and a nitrogen component of separated water.

Means for Solving Problem

As a result of intensive studies of the present inventors in order to attain the object described above, the followings have been found. That is, it has been found that a polymer coagulant is added and mixed into specific organic wastewater, and thus, a flock containing an organic body nitrogen component such as a protein or a phosphorus compound is formed, and after that, the flock is recovered from the organic wastewater by performing solid-liquid separation, and thus, the organic body nitrogen component and the phosphorus compound can be efficiently separated and recovered, and SS, BOD, COD, and a nitrogen component in the separated water can be reduced.

Until now, there have been no reports or actual achievements of consideration on a treatment method for coagulating and separating the organic body nitrogen component in the organic wastewater with only the polymer coagulant without using an inorganic coagulant. However, the present inventors have found that the organic body nitrogen component in the organic wastewater is efficiently incorporated into the flock, and the phosphorus compound, SS, a BOD component, and a COD component in the organic wastewater are also simultaneously and excellently coagulated, by a coagulation treatment using only the polymer coagulant, preferably by using a specific polymer coagulant, and after that, the flock is separated by performing the solid-liquid separation, and thus, the organic body nitrogen component and the phosphorus compound can be efficiently recovered, and high-quality separated water can be obtained.

That is, in an treatment method for organic wastewater according to one aspect of the invention, a flock is formed by adding a polymer coagulant into organic wastewater in which an organic body nitrogen component is greater than or equal to 4%/SS and less than or equal to 50%/SS with respect to a suspended solid (SS), and the organic body nitrogen component is greater than or equal to 250 mg/L and less than or equal to 50000 mg/L, and then, the flock is separated from the organic wastewater by performing solid-liquid separation.

Effect of the Invention

According to one aspect of the invention, an effect is obtained in which an organic body nitrogen component and a phosphorus compound are efficiently separated and recovered even in the case of wastewater in which an organic body nitrogen component in whole organic wastewater and SS is high, and high-quality separated water is obtained by reducing SS, BOD, COD, and a nitrogen component of separated water.

MODE(S) FOR CARRYING OUT THE INVENTION

Hereinafter, one aspect of the invention will be described in detail.

<Description of Terms>

First, some terms in this specification will be described.

"Organic wastewater" indicates wastewater containing an organic substance. For example, the organic wastewater contains a BOD component, a COD component, a nitrogen component, an organic body nitrogen component, and a phosphorus compound, and in accordance with a case, may contain a suspended substance, a colloidal substance, an ionic component, and the like other than the components described above.

"BOD" indicates contamination due to water-soluble and water-insoluble organic substances contained in the organic wastewater. Herein, the value of BOD indicates a value that is measured on the basis of a BOD analysis method described in JIS K 0102:21 and 32.3. Accordingly, herein, "BOD" indicates BOD5 that is measured by a method of culturing a sample for 5 days. In addition, herein, a component that is detected as BOD will be referred to as a "BOD component" for the sake of convenience of description.

"COD" indicates contamination due to water-soluble and water-insoluble organic substances contained in the organic wastewater, and herein, may be used as an alternative value of BOD. Herein, the value of COD indicates a value that is measured on the basis of a COD (Mn) analysis method described in JIS K 0102:17. Accordingly, herein, "COD" indicates COD (Mn) that is measured by a method of using potassium permanganate as an oxidizer. In addition, herein, a component that is detected as COD will be referred to as a "COD component" for the sake of convenience of description.

A "nitrogen component" indicates a nitrogen component contained in the organic wastewater, and includes an organic body nitrogen component, an ammonia body nitrogen component, a nitrite body nitrogen component, a nitrate body nitrogen component, and the like.

Figure 1:
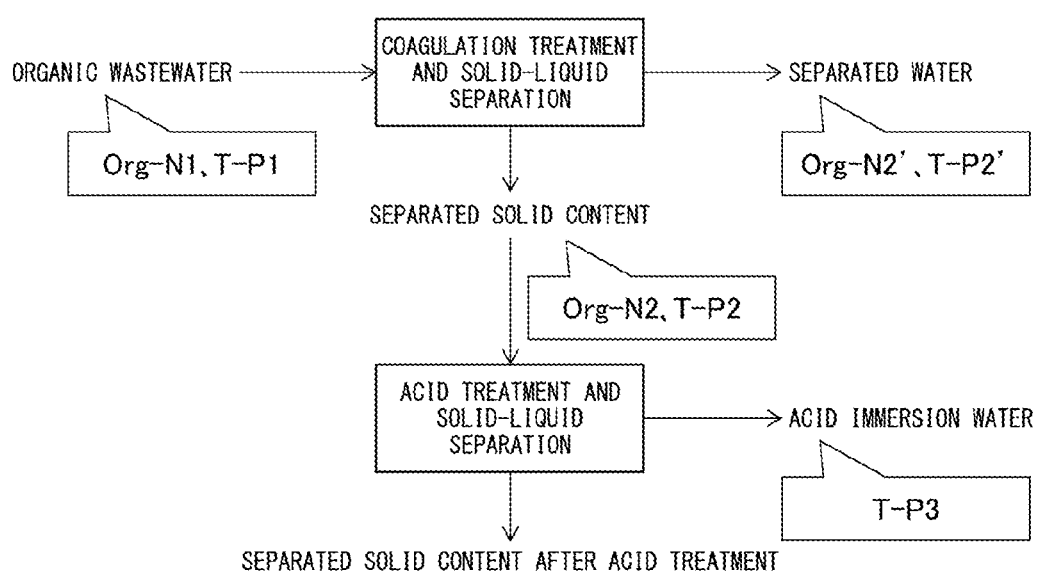
FIG. 1 is a diagram illustrating the outline of a treatment step of the invention.

An "organic body nitrogen component" indicates a whole protein contained in the organic wastewater. Furthermore, in the invention, the organic wastewater to be treated may contain a nitrogen component other than the organic body nitrogen component. Herein, specifically, the value of the organic body nitrogen component indicates a value that is measured by using a Bradford method. In addition, herein, as illustrated in FIG. 1, the organic wastewater, a separated solid content, and an organic body nitrogen component of separated water will be respectively referred to as Org-N1, Org-N2, and Org-N2'.

A "phosphorus compound" indicates whole phosphorus contained in the organic wastewater. Herein, the value of the phosphorus compound indicates a value that is measured on the basis of a potassium peroxydisulfate decomposition method and a molybdenum blue absorptiometric method described in JIS K 0102:46.3.1 and JIS K 0102:46.1.1. In addition, herein, as illustrated in FIG. 1, the organic wastewater, the separated solid content, the separated water, and a phosphorus compound in acid immersion water will be respectively referred to as T-P1, T-P2, T-P2', and T-P3.

An "ionic component" indicates an anionic or ampholytic organic high molecular component, and an anionic component derived from an inorganic salt that are contained in the organic wastewater.

A "minus charge component" indicates a whole component having a minus charge, such as the BOD component, the COD component, the organic body nitrogen component, and the phosphorus compound, and the suspended substance, the colloidal substance, the ionic component, and the like other than the components described above that are contained in the organic wastewater or a supernatant liquid of the organic wastewater. In addition, a minus charge component contained in whole organic wastewater will be referred to as a minus charge component (a whole), and a minus charge component contained in the supernatant liquid of the organic wastewater will be referred to as a minus charge component (a supernatant). Furthermore, specifically, the supernatant liquid of the organic wastewater indicates a liquid phase portion that is obtained by performing solid-liquid separation according to centrifugal separation with respect to the organic wastewater at 3000 rpm for 5 minutes.

A "colloid value" indicates a charge amount contained in the organic wastewater or the supernatant liquid of the organic wastewater. In addition, here, the charge amount is derived from the minus charge component contained in the organic wastewater. The colloid value (the supernatant) (meq/l) indicates a charge amount contained in the supernatant liquid that is obtained by performing centrifugal separation with respect to the organic wastewater at 3000 rpm×5 minutes, and the colloid value (the whole) (meq/l) indicates the charge amount contained in the organic wastewater.

Specifically, the colloid value (the supernatant) indicates a value that is measured in the following procedure.

(1) 100 ml of the organic wastewater is weighed and put into a centrifuge tube.

(2) The solid-liquid separation is performed according to the centrifugal separation at 3000 rpm for 5 minutes, and thus, a liquid phase portion is sampled as the supernatant liquid.

(3) 10 ml of the supernatant liquid is sampled into a tall beaker of 200 ml, and 90 ml of pure water is added.

(4) Further, 2 ml of a solution of methyl glycol chitosan of 1/200 N is added, and stirring is performed.

(5) Further, 1 and 2 drops of toluidine blue are added as an indicator.

(6) Titration is performed with an aqueous solution of polyvinyl potassium sulfate of 1/400 N while performing stirring at 500 rpm, and a titration amount X (ml) is measured in which the color of the liquid is changed to pink from blue.

(7) Similarly, titration is performed with respect to 100 ml of pure water in the operations of (2) and (3), and a blank titration amount Y (ml) is measured.

(8) The colloid value (meq/l) is obtained by using Numerical Expression (4) described below.

[Expression 1]

$$\text{Colloid Value (Supernatant)} = \frac{(\text{Titration Amount } X - \text{Titration Amount } Y)}{10} \times \frac{1}{400} \times 1000 \text{ (meq/l)} \quad (4)$$

Specifically, the colloid value (the whole) indicates a value that is measured in the following procedure.

(1) 10 ml of the organic wastewater is weighed and put into a glass beaker of 200 ml, and 90 ml of pure water is added.

(2) 10 ml of a solution of methyl glycol chitosan of 1/200 N is added, and stirring is performed.

(3) Stirring is performed at 500 rpm for 10 minutes by using a magnetic stirrer.

(4) The stirred matter is moved to a centrifuge tube, and is subjected to solid-liquid separation according to centrifugal separation at 3000 rpm for 10 minutes, and 60 ml of a liquid phase portion is sampled into a tall beaker of 200 ml.

(5) 1 and 2 drops of toluidine blue are added as an indicator.

(6) Titration is performed with an aqueous solution of polyvinyl potassium sulfate of 1/400 N while performing stirring at 500 rpm, and a titration amount W (ml) is measured in which the color of the liquid is changed to pink from blue.

(7) Titration is performed with respect to 100 mL of pure water in the operations of (2) to (6), and a blank titration amount Z (ml) is measured.

(8) The colloid value (meq/l) is obtained by using Numerical Expression (5) described below.

[Expression 2]

$$\text{Colloid Value (Whole)} = \frac{(\text{Titration Amount } W - \text{Titration Amount } Z)}{2} \text{(meq/l)} \quad (5)$$

"TS" indicates an evaporation residue in the organic wastewater. Herein, specifically, the value of TS indicates a value that is measured in the following procedure.

(1) 50 g of the organic wastewater is dried at 105° C. for 6 hours, and a residual amount (a total solid content amount D) (g) is weighed.

(2) TS (%) is obtained by using Numerical Expression (6) described below.

[Expression 3]

$$TS = \frac{\text{Precipitate Solid Content Amount } D \text{ [g]}}{100} \times 100(\%) \quad (6)$$

"SS" indicates a floating substance in the organic wastewater. Herein, specifically, the value of SS indicates a value that is measured in the following procedure.

(1) 50 ml of the organic wastewater is weighed and put into a centrifuge tube.

(2) Centrifugal separation is performed at 3500 rpm for 10 minutes, and a precipitate is sampled.

(3) The precipitate is dried at 105° C. for 6 hours as it is, and a residual amount (a precipitate solid content amount C) (g) is weighed.

(4) SS (%) is obtained by using Numerical Expression (7) described below.

[Expression 4]

$$SS = \frac{\text{Precipitate Solid Content Amount } C \text{ [g]}}{100} \times 100 (\%) \quad (7)$$

"SVI3000" indicates a specific volume of a precipitate that is obtained by performing centrifugal separation with respect to the organic wastewater at 3000 rpm for 5 minutes. Herein, specifically, the value of SVI3000 indicates a value that is measured in the following procedure.

(1) 100 ml of the organic wastewater is weighed and put into a centrifuge tube.

(2) A liquid phase portion and a precipitate are separated from each other by performing solid-liquid separation according to centrifugal separation at 3000 rpm for 5 minutes.

(3) A volume E (ml) of the liquid phase portion is measured.

(4) The total amount of the precipitate is dried at 105° C. for 6 hours as it is, and a residual amount (a precipitate solid content amount F) (g) is weighed.

(5) SVI3000 (ml/g) is obtained by using Numerical Expression (8) described below.

[Expression 5]

$$SVI3000 = \frac{100 - \text{Volume } E}{\text{Precipitate Solid Content Amount } F} (\text{ml/g}) \quad (8)$$

A "minus charge ratio" indicates a content ratio between the minus charge component (the whole) and the minus charge component (the supernatant). In a case where the minus charge ratio is high, it is indicated that the content of the minus charge component (the supernatant) with respect to the minus charge (the whole) is high, and in a case where the minus charge ratio is low, it is indicated that the content of the minus charge component of the supernatant liquid with respect to the minus charge (the whole) is low. Herein, specifically, the value of the minus charge ratio is obtained by Numerical Expression (1) described below.

[Expression 6]

$$\text{Minus Charge Raio} = \quad (1)$$
$$\frac{\text{Colloid Value(Supernatant)}}{\text{Colloid Value(Whole)}} \times \frac{TS}{TS - SS} \times \log_{10} SVI3000$$

An "electrical conductivity" indicates an index of the amount of ionic component and salts contained in the organic wastewater, and herein, the value of the electrical conductivity indicates a value that is measured on the basis of a measurement method of an electrical conductivity described in JIS K 0102:13.

A "constituent unit" indicates a structural unit including a structural unit derived from a monomer molecule that is formed by polymerizing a monomer, or a structural unit derived from two or more monomer molecules in which pendant groups are linked to each other by a reaction between a pendant group of a structural unit derived from a monomer molecule and a pendant group of a structural unit derived from the other monomer molecule.

A "coagulant" indicates a medical agent having a function of forming a flock by coagulating the water-soluble and water-insoluble contamination substances, the minus charge component, and the like that are contained in the organic wastewater. The flock, for example, can be obtained as a fine flock, a coagulation flock, and the like. In addition, herein, a "polymer coagulant" indicates a high molecular compound in the coagulant.

A "polymer" indicates a high molecular compound having a structure that is configured of a single type or a plurality of types of constituent units.

A "coagulation treatment" indicates that the flock is formed by coagulating the water-soluble and water-insoluble contamination substances, the minus charge component, and the like that are contained in the organic wastewater, and then, the separated water and the flock that is the separated solid content are obtained by performing solid-liquid separation.

The "separated water" indicates a liquid fraction from which the flock is separated by solid-liquid separation in the coagulation treatment of the organic wastewater.

The "separated solid content" indicates the flock that is separated from the separated water by solid-liquid separation in the coagulation treatment of the organic wastewater.

An "acid treatment" indicates a treatment in which the separated solid content is immersed in an aqueous solution of an acid medical agent, and the phosphorus compound is extracted.

"Acid immersion water" indicates liquid fraction that is separated from the solid content by solid-liquid separation after the separated solid content is subjected to the acid treatment.

The "separated solid content after the acid treatment" indicates the solid content that is separated from the acid immersion water by solid-liquid separation after the separated solid content is subjected to the acid treatment.

An "adsorption rate" indicates a ratio of the organic body nitrogen component and the phosphorus compound that are adsorbed in the separated solid content by being separated from the organic wastewater. Herein, the adsorption rate of the organic body nitrogen component and the adsorption rate of the phosphorus compound are respectively obtained by using Numerical Expressions (9) and (10) described below.

[Expression 7]

$$\text{Adsorption Rate of Organic Body Nitrogen Component}(\%) = \left(1 - \frac{Org - N2'}{Org - N1}\right) \times 100 \quad (9)$$

[Expression 8]

$$\text{Adsorption Rate of Phosphorus Compound}(\%) = \left(1 - \frac{T - P2'}{T - P1}\right) \times 100 \quad (10)$$

A "residual rate" indicates a ratio of the organic body nitrogen component and the phosphorus compound that remain in the separated water. Herein, the residual rate of the organic body nitrogen component and the residual rate of the phosphorus compound are respectively obtained by using Numerical Expressions (11) and (12) described below.

[Expression 9]

$$\text{Residual Rate of Organic Body Nitrogen Component}(\%) = \left(\frac{Org - N2'}{Org - N1}\right) \times 100 \quad (11)$$

[Expression 10]

$$\text{Residual Rate of Phosphorus Compound}(\%) = \left(\frac{T - P2'}{T - P1}\right) \times 100 \quad (12)$$

A "recovery rate" of the phosphorus compound indicates a ratio of the phosphorus compound that is extracted and separated in the acid immersion water by the acid treatment. Herein, the recovery rate of the phosphorus compound is obtained by using Numerical Expression (13) described below.

[Expression 11]

$$\text{Recovery Rate of Phosphorus Compound}(\%) = \left(\frac{T - P3}{T - P1}\right) \times 100 \quad (13)$$

<Treatment Method for Organic Wastewater>

A treatment method for organic wastewater according to one aspect of the invention is a method in which a flock is formed by adding a polymer coagulant into organic wastewater in which an organic body nitrogen component is greater than or equal to 4%/SS and less than or equal to 50%/SS with respect to a suspended solid (SS), and the organic body nitrogen component is greater than or equal to 250 mg/L and less than or equal to 50000 mg/L, and then, the flock is separated from the organic wastewater by performing solid-liquid separation.

Even in the case of wastewater in which the content of the organic body nitrogen component is greater than or equal to 250 mg/L and less than or equal to 50000 mg/L, and greater than or equal to 4%/SS and less than or equal to 50%/SS, that is, the organic component in SS is high, it is possible to efficiently separate and recover the organic body nitrogen component and the phosphorus compound by using the polymer coagulant. In addition, according to more preferred aspect of the invention, even in the case of wastewater containing a large amount of minus charge component, it is possible to efficiently separate and recover the organic body nitrogen component and the phosphorus compound by using the polymer coagulant. In addition, SS, BOD, COD, and the nitrogen component in the separated water can be excellently reduced compared to organic wastewater before the treatment. In addition, it is sufficient to perform solid-liquid separation by mixing the polymer coagulant into the organic wastewater, and thus, it is possible to simplify the treatment.

[Organic Wastewater]

The organic wastewater to be subjected to the treatment method for organic wastewater according to one aspect of the invention may be wastewater containing the organic substance as described above. Specifically, livestock excrement wastewater that is generated from a livestock facility, a peptic juice that is obtained by performing a methane fermentation treatment with respect to wastewater containing excrement, and the like can be exemplified as the organic wastewater. In addition, wastewater such as living sewage and sewage containing human waste, wastewater that is generated from a beverage factory and a food factory, wastewater that is generated from a chemical factory of dyeing, a resin, a fiber, a chemical product, and the like, wastewater that is generated from various factory facilities other than those exemplified here, and the like can be exemplified as the organic wastewater.

The organic substance that is contained in the organic wastewater to be subjected to the treatment method for organic wastewater according to one aspect of the invention may be any one of the water-soluble and water-insoluble organic substances, or may be a mixture thereof. The value of COD and a total protein concentration (that is, an organic body nitrogen component concentration) can be used as an index of the content of the organic substance.

The range of COD in the organic wastewater to be subjected to the treatment method for organic wastewater according to one aspect of the invention is preferably greater than or equal to 2000 mg/l, is more preferably greater than or equal to 4000 mg/l, and is even more preferably greater than or equal to 7000 mg/l. In a case where COD of the organic wastewater is within the range described above, in the coagulation treatment, an excellent recovery effect of organic body nitrogen, and an excellent reduction effect of a load on the treatment of BOD, COD, the nitrogen component, and the like are obtained. Accordingly, it is possible to obtain high-quality separated water by the treatment method for organic wastewater of the invention.

The range of SS in the organic wastewater to be subjected to the treatment method for organic wastewater according to one aspect of the invention is preferably greater than or equal to 50 mg/l, is more preferably greater than or equal to 500 mg/l, and is even more preferably greater than or equal to 1000 mg/l. In addition, the range of SS is preferably less than or equal to 100000 mg/l, is more preferably less than or equal to 50000 mg/l, and is even more preferably less than or equal to 30000 mg/l. In a case where SS in the organic wastewater is within the range described above, in the coagulation treatment of the organic wastewater, a coagulation flock containing the organic body nitrogen component and the phosphorus compound is excellently formed, and a reduction effect of the nitrogen component in the separated water and a recovery efficiency of the organic body nitrogen component and the phosphorus compound are excellent.

The range of TS in the organic wastewater to be subjected to the treatment method for organic wastewater according to one aspect of the invention is preferably greater than or equal to 100 mg/l, is more preferably greater than or equal to 1000 mg/l, and is even more preferably greater than or equal to 2000 mg/l. In addition, the range of SS is preferably less than or equal to 100000 mg/l, is more preferably less than or equal to 50000 mg/l, and is even more preferably less than or equal to 30000 mg/l. In a case where TS in the organic wastewater is within the range described above, in the coagulation treatment of the organic wastewater, the coagulation flock containing the organic body nitrogen component and the phosphorus compound is excellently formed, and the reduction effect of the nitrogen component in the separated water and the recovery efficiency of the organic body nitrogen component and the phosphorus compound are excellent.

The range of the organic body nitrogen component with respect to SS in the organic wastewater to be subjected to the treatment method for organic wastewater according to one aspect of the invention may be greater than or equal to 4%/SS. In addition, it is more preferable that the range is greater than or equal to 6%/SS. In addition, the range of the organic body nitrogen component with respect to SS may be less than or equal to 50%/SS, and it is more preferable that the range is less than or equal to 40%/SS.

In a case where the organic body nitrogen component with respect to SS in the organic wastewater is greater than or equal to the lower limit, the recovery effect of the organic body nitrogen component is high, and in a case where the organic body nitrogen component with respect to SS in the organic wastewater is less than or equal to the upper limit, the coagulation flock is excellently formed. In a case where the organic body nitrogen component with respect to SS in the organic wastewater is within the range described above, in the coagulation treatment of the organic wastewater, the coagulation flock containing the organic body nitrogen component and the phosphorus compound is excellently formed, and the reduction effect of the nitrogen component in the separated water and the recovery efficiency of the organic body nitrogen component and the phosphorus compound are excellent.

The range of the organic body nitrogen component concentration in the organic wastewater to be subjected to the treatment method for organic wastewater according to one aspect of the invention may be greater than or equal to 250 mg/l. In addition, it is more preferable that the range is greater than or equal to 800 mg/l, and it is even more preferable that the range is greater than or equal to 1000 mg/l. In addition, the range of the organic body nitrogen component concentration may be less than or equal to 50000 mg/l, and it is more preferable that the range is less than or equal to 30000 mg/l, and it is even more preferable that the range is less than or equal to 10000 mg/l. In a case where the organic body nitrogen component concentration in the organic wastewater is greater than or equal to the lower limit, the recovery efficiency of the organic body nitrogen component is high, and in a case where the organic body nitrogen component concentration in the organic wastewater is less than or equal to the upper limit, the coagulation flock is excellently formed. In a case where the organic body nitrogen component concentration in the organic wastewater is within the range described above, in the coagulation treatment of the organic wastewater, the coagulation flock containing the organic body nitrogen component and the phosphorus compound is excellently formed, and the reduction effect of the nitrogen component in the separated water and the recovery efficiency of the organic body nitrogen component and the phosphorus compound are excellent.

The range of the phosphorus compound with respect to the total volume of the organic wastewater to be subjected to the treatment method for organic wastewater according to one aspect of the invention may be greater than or equal to 100 mg/l. In addition, it is more preferable that the range is greater than or equal to 300 mg/l, and it is even more preferable that the range is greater than or equal to 600 mg/l. In addition, the range of the phosphorus compound with respect to the total volume may be less than or equal to 7000 mg/l, and it is more preferable that the range is less than or equal to 5000 mg/l, and it is even more preferable that the range is less than or equal to 3000 mg/l. In a case where the phosphorus compound with respect to the total volume of the organic wastewater is within the range described above, in the coagulation treatment of the organic wastewater, the coagulation flock containing the organic body nitrogen component and the phosphorus compound is excellently formed, and the reduction effect of the nitrogen component in the separated water and the recovery efficiency of the organic body nitrogen component and the phosphorus compound are excellent.

The range of the colloid value (the whole) of the organic wastewater to be subjected to the treatment method for organic wastewater according to one aspect of the invention may be greater than or equal to −25.0 meq/l. In addition, it is more preferable that the range is greater than or equal to −20.0 meq/l, and it is even more preferable that the range is greater than or equal to −18.0 meq/l. In addition, the range of the colloid value (the whole) of the organic wastewater may be less than or equal to −1.5 meq/l. In addition, it is more preferable that the range is less than or equal to −3.0 meq/l, and it is even more preferable that the range is less than or equal to −4.0 meq/l. In a case where the range of the colloid value (the whole) in the organic wastewater is within the range described above, in the coagulation treatment of the organic wastewater, the coagulation flock containing the organic body nitrogen component and the phosphorus compound is excellently formed, and the reduction effect of the nitrogen component in the separated water and the recovery efficiency of the organic body nitrogen component and the phosphorus compound are excellent.

The range of the electrical conductivity of the organic wastewater to be subjected to the treatment method for organic wastewater according to one aspect of the invention may be greater than or equal to 1.5 mS/cm. In addition, it is more preferable that the range is greater than or equal to 2.0 mS/cm. In addition, the range of the electrical conductivity of the organic wastewater may be less than or equal to 30.0 mS/cm. In addition, it is more preferable that the range is less than or equal to 20.0 mS/cm. In a case where the range of the electrical conductivity of the organic wastewater is within the range described above, in the coagulation treatment of the organic wastewater, the coagulation flock containing the organic body nitrogen component and the phosphorus compound is excellently formed, and the reduction effect of the nitrogen component in the separated water and the recovery efficiency of the organic body nitrogen component and the phosphorus compound are excellent.

The range of the minus charge ratio in the organic wastewater to be subjected to the treatment method for organic wastewater according to one aspect of the invention is preferably greater than or equal to 0.01, and is more preferably greater than or equal to 0.1. In addition, the range of the minus charge ratio in the organic wastewater is preferably less than or equal to 3.4, and is more preferably less than or equal to 3.0. In a case where the range of the minus charge ratio in the organic wastewater is within the range described above, in the coagulation treatment of the organic wastewater, the coagulation flock containing the organic body nitrogen component and the phosphorus compound is excellently formed, and an excellent reduction effect of the nitrogen component in the separated water and an excellent recovery efficiency of the organic body nitrogen component and the phosphorus compound are obtained.

As described above, the treatment method for organic wastewater according to the invention is excellent for separating and recovering the organic body nitrogen component and the phosphorus compound, and thus, the organic wastewater containing the organic body nitrogen component and the phosphorus compound can be preferably used, and the flock obtained as a result thereof contains the organic body nitrogen component and the phosphorus compound.

[Polymer Coagulant: Polymer Coagulant (X)]

The polymer coagulant that is used in the treatment method for organic wastewater according to the invention is not particularly limited, and a polymer coagulant (X) formed of at least one type of polymer material having a cationic constituent unit and a nonionic constituent unit can be preferably used.

(Constituent Unit)

The range of the content of the cationic constituent unit with respect to a sum of all of the constituent units of each of the polymer materials configuring the polymer coagulant (X), for example, is greater than or equal to 1 mol %, is preferably greater than or equal to 15 mol %, is more preferably greater than or equal to 20 mol %, and even more preferably greater than or equal to 30 mol %. In addition, the range of the content is preferably less than 100 mol %, is more preferably less than or equal to 99 mol %, is more preferably less than or equal to 90 mol %, is even more preferably less than or equal to 60 mol %, and is particularly preferably less than or equal to 50 mol %.

The range of the content of the nonionic constituent unit with respect to the sum of all of the constituent units of each of the polymer materials configuring the polymer coagulant (X) is more preferably greater than or equal to 1 mol %, is preferably less than or equal to 99 mol %, and is more preferably less than or equal to 85 mol %.

In a case where the polymer coagulant (X) having the cationic constituent unit within the range, in the coagulation treatment of the organic wastewater, the coagulation flock containing the organic body nitrogen component and the phosphorus compound can be excellently formed.

More specifically, an optimal value of the range of the content of the cationic constituent unit with respect to the sum of all of the constituent units of each of the polymer materials configuring the polymer coagulant (X) is different in accordance with the range of the minus charge ratio in the organic wastewater. Specifically, in a case where the minus charge ratio in the organic wastewater is set to a, and a mole percentage of the cationic constituent unit with respect to the sum of all of the constituent units of each of the polymer materials configuring the polymer coagulant (X) is set to β, it is preferable that a and β satisfy a relationship of Numerical Expression (2) described below and Numerical Expression (3) described below, and it is more preferable that a and β satisfy a relationship of Numerical Expression (14) described below and Numerical Expression (15) described below.

[Expression 12]

$$\beta \geq -50 \times \alpha + 75 \quad (2)$$

[Expression 13]

$$\beta \leq -50 \times \alpha + 178 \quad (3)$$

[Expression 14]

$$\beta \geq -50 \times \alpha + 95 \quad (14)$$

[Expression 15]

$$\beta \leq -50 \times \alpha + 140 \quad (15)$$

The organic wastewater to be subjected to the treatment method for organic wastewater according to one aspect of the invention has a high colloid value (the whole) and contains a large amount of minus charge component (the whole). In addition, the organic wastewater having a high minus charge ratio has a feature that the content of the minus charge component (the supernatant) with respect to the minus charge (the whole) is high. Such organic wastewater contains a large amount of minus charge component in the supernatant, and thus, it is assumed that the polymer coagulant in which the content of the cationic constituent unit is high is used.

However, in the organic wastewater of which the content of the minus charge component (the supernatant) with respect to the minus charge (the whole) is high, Numerical Expression (2) described above and Numerical Expression (3) described above represent that the polymer coagulant in which the content of the cationic constituent unit is low is effective. This is different from the general use of the coagulant.

In one aspect of the invention, the cationic constituent unit of the polymer coagulant and the minus charge component in the organic wastewater react with each other, and thus, a high-viscosity insolubilized matter is formed as a fine flock, in a coagulation flock forming process of the coagulation treatment. In particular, the minus charge component (the supernatant) has high reactivity with respect to the cationic constituent unit of the polymer coagulant, and rapidly reacts with the polymer coagulant, and thus, a mucilaginous fine flock is formed. After that, the fine flock is coagulated, and grows to a coarse coagulation flock, and it is considered that when the fine flock grows to the coarse coagulation flock, the organic body nitrogen component is incorporated into the coagulation flock.

Here, it is important that the fine flock having high mucilaginous properties and excellent coagulation properties, in order to excellently form the coagulation flock containing the organic body nitrogen component and the phosphorus compound. For this reason, it is preferable that the polymer coagulant and the organic wastewater are homogeneously mixed, and then, the cationic constituent unit of the polymer coagulant and the minus charge component react with each other. In a case where the cationic constituent unit of the polymer coagulant and the minus charge component react with each other before the organic wastewater and the polymer coagulant are homogeneously mixed, insolubilization due to self-crosslinking of the polymer coagulant progresses, and thus, it is difficult to form the fine flock. A phenomenon of causing the self-crosslinking easily occurs when components having a high reaction rate are mixed. In the minus charge component (the supernatant), the minus charge component is dispersed in the supernatant, that is, a liquid phase, and thus, the minus charge component (the supernatant) has a high reaction rate with respect to a cationic polymer coagulant, among the minus charge components. In addition, in the cationic polymer coagulant, the reaction with respect to the minus charge component becomes faster as the cationic constituent unit content becomes higher, and the reaction with respect to the minus charge component becomes slower as the cationic constituent unit content becomes lower. Accordingly, in a case where a coagulant having a high cationic constituent unit content is added and mixed into the wastewater containing a large amount of minus charge component (the supernatant), the insolubilization due to the self-crosslinking occurs, and thus, it is difficult to form the flock. On the contrary, in the case of using a coagulant having a low cationic constituent unit content in the wastewater containing a small amount of minus charge component (the supernatant), the reactivity becomes slow, and thus, it is preferable to use the coagulant having a high cationic constituent unit content.

In a case where the range of the minus charge ratio α in the organic wastewater, and the mole percentage β of the cationic constituent unit with respect to the sum of all of the constituent units of each of the polymer materials configuring the polymer coagulant (X) is a range satisfying the relationship of Numerical Expression (2) described above and Numerical Expression (3) described above, the polymer coagulant (X) and the organic wastewater are homogeneously mixed, and then, the cationic constituent unit of the polymer coagulant and the minus charge component react with each other, and a fine flock having high mucilaginous properties and excellent coagulation properties is formed.

In the case of the polymer coagulant (X) having the cationic constituent unit in the range satisfying Numerical Expression (2) described above and Numerical Expression (3) described above, in the coagulation treatment of the organic wastewater, the coagulation flock containing the organic body nitrogen component and the phosphorus compound is excellently formed. For this reason, an excellent recovery effect of the organic body nitrogen component and the phosphorus compound, and an excellent reduction effect of SS, BOD, COD, and the nitrogen component in the separated water are obtained. Accordingly, according to the treatment method for organic wastewater of the invention, it is possible to obtain high-quality separated water.

In addition, in the case of the polymer coagulant (X) having the cationic constituent unit in the range satisfying Numerical Expression (2) described above and Numerical Expression (3) described above, the coagulation flock containing the organic body nitrogen component and the phosphorus compound is excellently formed in the wastewater having a small minus charge ratio even in a case where the cationic constituent unit content is high, and specifically, even in a case where p is greater than 60 mol %, and an unexpected effect that a reduction effect of the organic body nitrogen component in the separated water and the recovery efficiency of the organic body nitrogen component and the phosphorus compound is obtained. In the case of using the coagulant having a low cationic constituent unit content in the wastewater having a small minus charge ratio, the reaction between the cationic constituent unit and the minus charge component becomes slow, and thus, it is preferable to ensure the reactivity by using the coagulant having a high cationic constituent unit content in the wastewater having a small minus charge ratio.

[Non-Amidine-Based Cationic Polymer (A)]

Preferably, a non-amidine-based cationic polymer (A) having a specific structure is contained in the polymer coagulant (X). The non-amidine-based cationic polymer (A) has a cationic constituent unit, and may have a nonionic constituent unit.

(Cationic Constituent Unit)

The cationic constituent unit of the non-amidine-based cationic polymer (A) is a constituent unit represented by General Formula (1) described below.

[Formula 1]

General Formula (1)

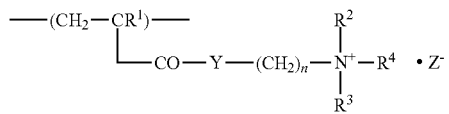

(In General Formula (1), $R^1$ represents a hydrogen atom or a methyl group, $R^2$ and $R^3$ each independently represent any one of a hydrogen atom and an alkyl group having 1 to 4 carbon atoms, $R^4$ represents an alkyl group having 1 to 4 carbon atoms or a benzyl group, Y represents an oxygen atom or NH, $Z^-$ represents a negative ion, and n represents an integer of 1 to 3.)

Specific examples of the cationic constituent unit represented by General Formula (1) include a cationic constituent unit derived from an amine salt of dialkyl aminoalkyl (meth)acrylate or an alkyl chloride quaternary salt, and a cationic constituent unit derived from an amine salt of dialkyl aminoalkyl (meth)acrylamide or an alkyl chloride quaternary salt that are a cationic monomer. Among them, dialkyl aminoalkyl (meth)acrylate alkyl chloride quaternary salt has high coagulation performance, and thus, is preferable. Only one type of such cationic monomers may be used, or two or more types thereof may be used together, as the monomer for configuring the cationic constituent unit.

The range of the content of the cationic constituent unit in the non-amidine-based cationic polymer (A) is not particularly limited, and for example, is greater than or equal to 1 mol %, is preferably greater than or equal to 8 mol %, is more preferably greater than or equal to 10 mol %, and is even more preferably greater than or equal to 15 mol %. In addition, the range of the content is preferably less than 100 mol %, is more preferably less than or equal to 80 mol %, is even more preferably less than or equal to 60 mol %, and is particularly preferably less than or equal to 50 mol %. By having the cationic constituent unit in the range, the coagulation flock containing the organic body nitrogen component and the phosphorus compound can be excellently formed in the coagulation treatment of the organic wastewater.

(Nonionic Constituent Unit)

The non-amidine-based cationic polymer (A) may have a nonionic constituent unit. Examples of the nonionic constituent unit include a constituent unit derived from a monomer that is (meth)acrylamide. The content of the nonionic constituent unit in the non-amidine-based cationic polymer (A) is more preferably greater than or equal to 1 mol %, and is more preferably less than or equal to 99 mol %.

(Viscosity)

The range of a reduced viscosity of the non-amidine-based cationic polymer (A) is preferably greater than or equal to 7.0 dl/g, and is more preferably greater than or equal to 9.0 dl/g. In addition, the range of the reduced viscosity is preferably less than or equal to 20.0 dl/g, and is more preferably less than or equal to 17.0 dl/g.

(Manufacturing Method)

A manufacturing method of the non-amidine-based cationic polymer (A) is not particularly limited, and a method such as an aqueous solution photopolymerization method, an adiabatic polymerization method, a dispersion polymerization method, and an emulsion polymerization method can be suitably selected. In the aqueous solution photopolymerization method, for example, an aqueous solution of the monomer in which the monomer for configuring the constituent unit is dissolved in water may be formed into the shape of a homogeneous sheet, and may be polymerized by being irradiated with visible light or ultraviolet light by using a photoinitiator. In the adiabatic polymerization method, for example, one or more types of initiators are added into the aqueous solution of the monomer, and polymerization is performed, and thus, aqueous gel-like polymeric matter is obtained. In the dispersion polymerization method, for example, the aqueous solution of the monomer may be dispersed in a non-aqueous solvent, and may be polymerized. In the emulsion polymerization method, the aqueous solution of the monomer may be emulsified by using an emulsifier in the non-aqueous solvent, and may be polymerized. In the case of the photopolymerization, the adiabatic polymerization, and the like, the polymer is acquired as an aqueous gel, and thus, it is more preferable that the aqueous gel is pulverized and dried to be a powder.

In addition, the manufacturing method of the non-amidine-based cationic polymer (A) having the reduced viscosity is not particularly limited, and a condition such as a polymerization time, a polymerization temperature, and an added amount of a chain transfer agent in a manufacturing step may be suitably selected in consideration of the viscosity of the polymer to be manufactured. In addition, it is preferable that the reduced viscosity is adjusted in accordance with the added amount of the chain transfer agent. The type of chain transfer agent is not particularly limited, and examples of the chain transfer agent include a thiol compound such as mercaptoethanol and a mercaptopropionic acid, reducing inorganic salts such as sodium sulfite, sodium hydrogen sulfite, and sodium hypophosphite, and the like. Among them, sodium hypophosphite is particularly preferable. The added amount of the chain transfer agent is preferably greater than or equal to 1 ppm, and is preferably less than or equal to 3000 ppm, with respect to the total monomer of a raw material.

[Amidine-Based Cationic Polymer (B)]

It is preferable that the polymer coagulant further contains a specific amidine-based cationic polymer (B). The amidine-based cationic polymer (B) has a high cation density, efficiently reacts with the organic body nitrogen component in the organic wastewater, and is insolubilized. For this reason, it is possible to form the coagulation flock containing a large amount of organic body nitrogen component. In addition, coagulation properties of BOD and COD are also improved, and thus, it is possible to obtain higher-quality separated water.

The amidine-based cationic polymer (B) has at least one of amidine constituent units represented by General Formula (2) described below and General Formula (3) described below.

[Formula 2]

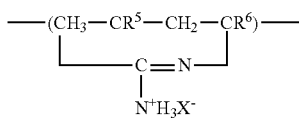

General Formula (2)

[Formula 3]

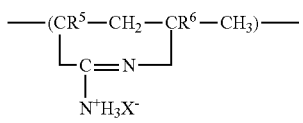

General Formula (3)

(In General Formula (2) and General Formula (3), $R^5$ and $R^6$ each independently represent any one of a hydrogen atom and a methyl group, and $X^-$ represents a negative ion.)

The range of the content of the amidine constituent unit in the amidine-based cationic polymer (B) is preferably greater than or equal to 30 mol %, and is more preferably greater than or equal to 40 mol %. In addition, the range of the content is preferably less than or equal to 90 mol %, and is more preferably less than or equal to 80 mol %. In a case where the range is within the range described above, in the coagulation treatment of the organic wastewater, the organic body nitrogen component can be efficiently insolubilized, and the coagulation flock containing a large amount of organic body nitrogen component can be formed.

(Manufacturing Method)

A manufacturing method of the amidine-based cationic polymer (B) is not particularly limited, and examples of the manufacturing method include a method of manufacturing a copolymer of an ethylenically unsaturated monomer having an amino group or a substituted amino group that is capable of forming an amino group by a conversion reaction, and nitriles such as acrylonitrile or methacrylonitrile, of performing amidinization by allowing a cyano group and an amino group in the copolymer to react with each other under an acid.

A compound represented by General Formula (4) described below is preferable as the ethylenically unsaturated monomer.

$$CH_2=CR^7-NHCOR^8 \qquad \text{General Formula (4)}$$

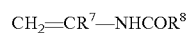

(In the formula, $R^7$ represents a hydrogen atom or a methyl group, and $R^8$ represents a hydrogen atom or an alkyl group having 1 to 4 carbon atoms.)

The copolymer is easily converted into an amino group by hydrolysis or alcoholysis. Further, the amino group is subjected to amidinization by reacting with the adjacent cyano group. Specific examples of the compound represented by General Formula (4) described above include N-vinyl formamide ($R^7=H$, $R^8=H$), N-vinyl acetamide ($R^7=H$, $R^8=CH_3$), and the like.

A use ratio between the ethylenically unsaturated monomer and nitriles in the copolymer is preferably 20:80 to 80:20, and is more preferably 40:60 to 60:40, at a molar ratio.

The most typical manufacturing method of the amidine-based cationic polymer (B) will be described. First, N-vinyl formamide and acrylonitrile are copolymerized in accordance with the above description. Next, an amidine constituent unit is formed of the amino group that is formed by heating and hydrolyzing the formed copolymer in the presence of a hydrochloric acid, and the adjacent cyano group, and thus, the amidine-based cationic polymer is manufactured. In this case, a molar ratio of N-vinyl formamide and acrylonitrile used in the copolymerization, and an amidinization condition of the copolymer are suitably selected, and thus, the amidine-based cationic polymer (B) having various compositions is obtained. Furthermore, the amidine-based cationic polymer (B) may be selected and used from commercially available products.

A reduced viscosity of the amidine-based cationic polymer (B) is preferably greater than or equal to 0.1 dl/g, and is more preferably greater than or equal to 1 dl/g, and is preferably less than or equal to 10 dl/g, and is more preferably less than or equal to 5 dl/g.

[Other Polymers]

The polymer coagulant that is used in the treatment method for organic wastewater according to one aspect of the invention may contain other non-amidine-based cationic polymers and other ampholytic polymers in addition to the non-amidine-based cationic polymer (A) and the amidine-based cationic polymer (B) within a range not impairing the effects of the invention. A mixing ratio of the other cationic polymers and the other ampholytic polymers is preferably less than 10 mass %, is more preferably less than 5 mass %, and is even more preferably less than 0 mass %, with respect to the total mass of the polymer coagulant.

[Forming Method of Flock]

A known method can be applied as a method of adding the polymer coagulant into the organic wastewater and a forming method of the flock.

As an adding method of the polymer coagulant, for example, it is preferable that the polymer coagulant is dissolved in water at a concentration of greater than or equal to 0.05 mass % and less than or equal to 0.5 mass %, and then, is added into the organic wastewater. In addition, in a case where the polymer coagulant is formed of two or more types of polymers of the non-amidine-based cationic polymer (A) and the amidine-based cationic polymer (B), it is more preferable that the polymer coagulant is added as one-type medical agent in which each of the polymers is mixed. In addition, the polymer coagulant may be added into the organic wastewater as a powder.

The added amount of the polymer coagulant in the organic wastewater may be suitably set in accordance with SS, the concentration of the minus charge component, and the like, and for example, as a rough standard, is an amount of greater than or equal to 1 ppm, and is an amount of less than or equal to 3000 ppm, in the organic wastewater.

In a coagulation treatment method for the organic wastewater of one aspect of the invention, in order to form a more excellent coagulation flock, a polymer coagulant formed of the non-amidine-based cationic polymer, the ampholytic polymer, or the anionic polymer other than the non-amidine-based cationic polymer (A) and the amidine-based cationic polymer (B) may be further added, after the polymer coagulant is added into the organic wastewater, as necessary.

It is preferable that the polymer coagulant is added while stirring the organic wastewater or the stirring is performed after the polymer coagulant is added. The number of rotations of the stirring that is performed while adding the polymer coagulant, and the number of rotations of the stirring after adding the polymer coagulant are preferably greater than or equal to 180 rpm, are more preferably greater than or equal to 500 rpm, are even more preferably greater than or equal to 800 rpm, and are particularly preferably greater than or equal to 1000 rpm. In addition, the number of rotations of the stirring is preferably less than or equal to 4000 rpm, is more preferably less than or equal to 3000 rpm, and is even more preferably less than or equal to 2000 rpm. By setting the number of rotations of the stirring to be greater than or equal to 180 rpm, the polymer coagulant is more homogeneously mixed. By setting the number of rotations of the stirring to be less than or equal to 3000 rpm, a stirring force do not become excessively strong, and thus, the fine flock excellently grows to the coagulation flock. In addition, according to such a range, the reduction effect of the nitrogen component in the separated water and the recovery efficiency of the organic body nitrogen component and the phosphorus compound are excellent.

In addition, an acid substance may be added at the time of adding the polymer coagulant. The acid substance is added, and thus, the solubility of the polymer coagulant with respect to water is improved. In addition, in a case where the acid substance is added into an aqueous solution of the polymer coagulant, it is possible to prevent the polymer coagulant from being degraded due to a decrease in the viscosity of the aqueous solution of the polymer coagulant, and the like. The acid substance may be added at an arbitrary time point such as before adding the polymer coagulant into the organic wastewater, after adding the polymer coagulant into the organic wastewater, and during adding the polymer coagulant into the organic wastewater. In addition, the acid substance may be added into the aqueous solution of the polymer coagulant before being added into the organic wastewater. Examples of the acid substance include a sulfamic acid, acid sodium sulfite, and the like.

In addition, a coagulant may be used together in addition to the polymer coagulant. Examples of the coagulant include an inorganic coagulant and an organic coagulant. The coagulant to be used together may be only one type, or may be a plurality of types. Even in a case where the polymer coagulant and the coagulant are used together, it is possible to sufficiently exhibit the reduction effect of SS, BOD, and COD.

Examples of the inorganic coagulant include ferric chloride, ferrous sulfate, ferric sulfate, poly-iron (iron polysulfate and iron polychloride), and the like.

Examples of the organic coagulant include an alkyl chloride quaternary salt of polyamine, polydiallyl dimethyl ammonium chloride, and polydialkyl aminoalkyl methacrylate, a cationic surfactant, and the like.

An adding time of the coagulant is not particularly limited, and it is preferable that the coagulant is added into the organic wastewater before the polymer coagulant is added. It is preferable that an added amount of the coagulant is within a range where the recovery rate of the phosphorus compound in the acid immersion water is not reduced, and the added amount is preferably greater than or equal to 5 parts by mass, and is preferably less than or equal to 3000 parts by mass, with respect to 100 parts by mass of the polymer coagulant to be added into the organic wastewater.

In addition, in a case where the added amount of the coagulant increases, the weight of the separated solid content and the separated solid content after the acid treatment increases, and handling such as conveyance becomes difficult, and thus, attention is required in the added amount.

[Solid-Liquid Separation]

A method of separating the flock from the organic wastewater by solid-liquid separation is not particularly limited, and examples of the method include a method such as coagulation precipitation, floatation separation, centrifugal separation, and filtration.

In addition, the flock that is subjected to solid-liquid separation from the organic wastewater may be dewatered by using a dewatering device. Examples of the dewatering device that can be used in the dewatering include a press dewaterer, a centrifugal dewaterer, a screw press dewaterer, a multi-disk type dewaterer, a rotary press filter, a vacuum dewaterer, and the like.

[Separating Method of Phosphorus Compound]

An extraction method using an acid treatment is preferable as a method of separating the phosphorus compound from the separated solid content. Specifically, the extraction method is a method in which the separated solid content is immersed in an aqueous solution of an acid medical agent, and the phosphorus compound is extracted. Furthermore, at this time, stirring and mixing may be performed by a stirrer at the time of performing the immersion. Examples of the acid medical agent include a hydrochloric acid, a sulfuric acid, a nitric acid, a phosphoric acid, a citric acid, and the like. In addition, the concentration of the aqueous solution of the acid medical agent is preferably greater than or equal to 0.05 mol/l, and is more preferably greater than or equal to 2.0 mol/l. In addition, an immersion time of the separated solid content is preferably longer than or equal to 1 minute, and is more preferably longer than or equal to 180 minutes. As described above, a manufacturing method of the phosphorus compound of separating the phosphorus compound from the separated solid content that is obtained by the treatment method for organic wastewater according to one aspect of the invention is also in the category of the invention.

[Adsorption Rate, Residual Rate, and Recovery Rate]

In the invention, the adsorption rate of the organic body nitrogen component is preferably greater than or equal to 50%, is more preferably greater than or equal to 60%, is even more preferably greater than or equal to 70%, is particularly preferably greater than or equal to 75%, and is most preferably greater than or equal to 80%, as a preferred range of the adsorption rate. In addition, the adsorption rate of the phosphorus compound is preferably greater than or equal to 60%, is more preferably greater than or equal to 70%, is even more preferably greater than or equal to 75%, is particularly preferably greater than or equal to 78%, and is most preferably greater than or equal to 80%. In addition, according to such a range, the reduction effect of the nitrogen component in the separated water and the recovery efficiency of the organic body nitrogen component and the phosphorus compound are excellent.

In the invention, a preferred range of the recovery rate of the phosphorus compound is preferably greater than or equal to 50%, is more preferably greater than or equal to 60%, is even more preferably greater than or equal to 65%, and is particularly preferably greater than or equal to 80%.

One aspect of the invention is not limited to the embodiment described above, and can be variously changed within the range described in the claims, and an embodiment that can be obtained by suitably combining technical means respectively disclosed in the embodiment is also included in the technical scope of the invention.

[Appendices]

As described above, preferred aspects of the treatment method for organic wastewater of the invention are as follows.

[1] A treatment method for organic wastewater, in which a flock is formed by adding a polymer coagulant into organic wastewater in which an organic body nitrogen component is greater than or equal to 4%/SS and less than or equal to 50%/SS with respect to a suspended solid (SS), and the organic body nitrogen component is greater than or equal to 250 mg/L and less than or equal to 50000 mg/L, and then, the flock is separated from the organic wastewater by performing solid-liquid separation.

[2] The treatment method for organic wastewater according to [1], in which the organic body nitrogen component is greater than or equal to 6%/SS and less than or equal to 40%/SS with respect to the suspended solid (SS) in the organic wastewater.

[3] The treatment method for organic wastewater according to [1] or [2], in which a minus charge ratio in the organic wastewater that is obtained by Numerical Expression (1) described below is greater than or equal to 0.01 and less than or equal to 3.4.

[Expression 16]

$$\text{Minus Charge Ratio} = \frac{\text{Colloid Value(Supernatant)}}{\text{Colloid Value(Whole)}} \times \frac{TS}{TS-SS} \times \log_{10} SVI3000 \quad (1)$$

(In Numerical Expression 1, a colloid value (a supernatant) (meq/1) represents a charge amount contained in a supernatant liquid that is obtained by performing centrifugal separation with respect to the organic wastewater at 3000 rpm for 5 minutes, a colloid value (a whole) (meq/1) represents a charge amount contained in the organic wastewater, and SVI3000 (ml/g) represents a specific volume of a precipitate that is obtained by performing centrifugal separation with respect to the organic wastewater at 3000 rpm for 5 minutes.)

[4] The treatment method for organic wastewater according to [1] to [3], in which the organic wastewater contains an organic body nitrogen component, and the flock is a flock containing the organic body nitrogen component.

[5] The treatment method for organic wastewater according to [4], in which the organic body nitrogen component is separated and recovered from the flock.

[6] The treatment method for organic wastewater according to any one of [1] to [3], in which the organic wastewater contains a phosphorus compound, and the flock is a flock containing the phosphorus compound.

[7] The treatment method for organic wastewater according to [6], in which the phosphorus compound is separated and recovered from the flock.

[8] The treatment method for organic wastewater according to any one of [1] to [7], in which the polymer coagulant is a polymer coagulant (X) formed of polymer materials having at least one type of cationic constituent unit, and a content of the cationic constituent unit with respect to a sum of all constituent units of each of the polymer materials configuring the polymer coagulant (X) is less than 100 mol %.

[9] The treatment method for organic wastewater according to any one of [1] to [8], in which in a case where the minus charge ratio in the organic wastewater is set to α, and the content of the cationic constituent unit with respect to the sum of all of the constituent units of each of the polymer materials configuring the polymer coagulant (X) is set to β mol %, α and β satisfy a relationship represented by Numerical Expression (2) described below and Numerical Expression (3) described below.

[Expression 17]

$$\beta \geq -50 \times \alpha + 75 \quad (2)$$

[Expression 18]

$$\beta \leq -50 \times \alpha + 178 \quad (3)$$

[10] The treatment method for organic wastewater according to [1] to [3], in which the flock that is obtained by performing the solid-liquid separation is subjected to an acid treatment.

[11] The treatment method for organic wastewater according to any one of [1] to [10], in which the polymer coagulant (X) is a non-amidine-based cationic polymer (A) having a cationic constituent unit represented by General Formula (1) described below.

[Formula 4]

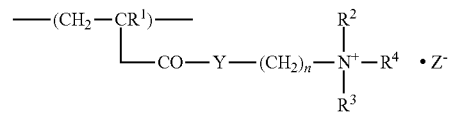

General Formula (1)

(In General Formula (1), $R^1$ represents a hydrogen atom or a methyl group, $R^2$ and $R^3$ each independently represent any one of a hydrogen atom and an alkyl group having 1 to 4 carbon atoms, $R^4$ represents an alkyl group having 1 to 4 carbon atoms or a benzyl group, Y represents an oxygen atom or NH, $Z^-$ represents a negative ion, and n represents an integer of 1 to 3.)

[12] The treatment method for organic wastewater according to any one of [1] to [11], in which the polymer coagulant (X) contains an amidine-based cationic polymer (B), the amidine-based cationic polymer (B) has at least one of amidine constituent units represented by General Formula (2) described below and General Formula (3) described below.

[Formula 5]

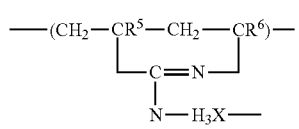

General Formula (2)

[Formula 6]

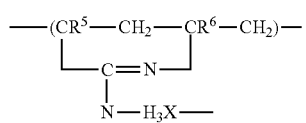

General Formula (3)

(In General Formula (2) and General Formula (3), $R^5$ and $R^6$ each independently represent any one of a hydrogen atom and a methyl group, and $X^-$ represents a negative ion.)

[13] A manufacturing method of a phosphorus compound, in which the phosphorus compound is separated from the flock that is obtained by performing the solid-liquid separation by the treatment method for organic wastewater according to any one of [1] to [12].

EXAMPLES

Hereinafter, the invention will be described in detail by using examples and comparative examples, but the invention is not limited to the following description unless exceeding the gist thereof. Furthermore, in the examples and the comparative examples, "%" indicates "mass %" unless otherwise noted. In each polymer obtained in the following manufacturing example, a reduced viscosity was measured as described below. In the measurement, a powder-like polymer coagulant was used.

[Measurement of Reduced Viscosity]

In a normal aqueous solution of sodium chloride, a reduced viscosity of 0.1 g/dL of a polymer solution was measured at 25° C. by an Ostwald viscosimeter.

Raw materials used in the examples are as follows.

[Monomer]

(i) Cationic Monomer:

(a) N,N-Dimethyl Aminoethyl Acrylate Methyl Chloride Quaternary Salt (hereinafter, referred to as "DME"), manufactured by OSAKA ORGANIC CHEMICAL INDUSTRY LTD., Aqueous Solution of 80 mass %

(b) N,N-Dimethyl Aminoethyl Methacrylate Methyl Chloride Quaternary Salt (hereinafter, referred to as "DMC"), manufactured by OSAKA ORGANIC CHEMICAL INDUSTRY LTD., Aqueous Solution of 80 mass %

(ii) Nonionic Monomer:

(a) Acrylamide (hereinafter, referred to as "AAM"), manufactured by Mitsubishi Chemical Corporation, Aqueous Solution of 50 mass %

(b) Acrylonitrile (hereinafter, referred to as "AN"), manufactured by Mitsubishi Chemical Corporation, Puridity of 99 mass %

(c) N-Vinyl Formamide (hereinafter, referred to as "NVF"), manufactured by Mitsubishi Chemical Corporation, Aqueous Solution of Puridity of 91 mass %

[Initiator]

(i) 2-Hydroxy-2-Methyl-1-Phenyl Propan-1-One (DAROCUR¹173), (hereinafter, referred to as "D-1173"), manufactured by Novartis International AG (ii) 2,2'-Azobis(2-Amidinopropane) Dihydrochloride (V-50) (hereinafter, referred to as "V-50"), manufactured by FUJIFILM Wako Pure Chemical Corporation.

[Chain Transfer Agent]

Sodium Hypophosphite (hereinafter, referred to as "HPA"), manufactured by FUJIFILM Wako Pure Chemical Corporation.

[Acid Medical Agent]

Hydrochloric Acid, Aqueous Solution of 0.1 mol/1, manufactured by FUJIFILM Wako Pure Chemical Corporation.

[Synthesis of Non-Amidine-Based Cationic Polymer (A)]

Manufacturing Example 1

506.5 g of DME and 1200.0 g of AAM were put into a brown heat-resistant bottle having an inner volume of 2000 mL, 0.14 g of HPA and distilled water were added, and thus, an aqueous solution of a monomer (DME:AAM=20.0:80.0 (mol %), a monomer concentration of 50%) having a total mass of 2000 g was prepared. Next, D-1173 was put such that D-1173 was 150 ppm with respect to the total mass of the aqueous solution of the monomer, and the temperature of the aqueous solution of the monomer was adjusted to 20° C. while blowing nitrogen gas for 30 minutes.

After that, the aqueous solution of the monomer was moved to a stainless steel reaction container, and light irradiation was performed at an irradiation intensity of 5 W/m² from the upper portion of the container by using a chemical lamp until a surface temperature became 40° C., while spraying water at 16° C. from the lower portion of the container. After the surface temperature reached 40° C., light irradiation was performed at an irradiation intensity of 0.3 W/m² for 30 minutes. Further, in order to reduce a residual amount of the monomer, light irradiation was performed at an irradiation intensity of 50 W/m² for 10 minutes, and thus, a hydrous gel-like polymer was obtained. The obtained hydrous gel-like polymer was taken out from the container, was crushed by using a small meat chopper, and then, was dried at a temperature of 60° C. for 16 hours. After that, the dried polymer was pulverized by using a Wiley type pulverizer, and thus, the non-amidine-based cationic polymer (A) (a polymer A-1) was obtained.

Manufacturing Examples 2 to 12

The non-amidine-based cationic polymer (A) (polymers A-2 to A-9 and polymers a-1 to a-3) was obtained by performing the same operation as that in Manufacturing Example 1 except that the amount of each of the monomers and HPAs was changed to a ratio shown in Table 1.

TABLE 1

| Polymer | AAM | DME | DMC | HPA [ppm] | Reduced viscosity [ηsp/C] |
|---|---|---|---|---|---|
| Manufacturing Example 1 | A-1 | 80.0 | 20.0 | 0.0 | 70 | 11.3 |
| Manufacturing Example 2 | A-2 | 70.0 | 30.0 | 0.0 | 60 | 10.4 |
| Manufacturing Example 3 | A-3 | 60.0 | 40.0 | 0.0 | 65 | 9.5 |
| Manufacturing Example 4 | A-4 | 50.0 | 50.0 | 0.0 | 55 | 10.3 |
| Manufacturing Example 5 | A-5 | 40.0 | 60.0 | 0.0 | 20 | 9.2 |
| Manufacturing Example 6 | A-6 | 20.0 | 80.0 | 0.0 | 20 | 9.2 |
| Manufacturing Example 7 | A-7 | 12.6 | 78.8 | 8.6 | 20 | 9.2 |
| Manufacturing Example 8 | A-8 | 8.0 | 92.0 | 0.0 | 20 | 9.1 |
| Manufacturing Example 9 | A-9 | 0 | 0 | 100.0 | 10 | 9.5 |
| Manufacturing Example 10 | a-1 | 90.0 | 10.0 | 0.0 | 25 | 13.3 |
| Manufacturing Example 11 | a-2 | 92.0 | 8.0 | 0.0 | 25 | 14.3 |
| Manufacturing Example 12 | a-3 | 96.0 | 4.0 | 0.0 | 25 | 14.7 |

Header note: Ratio of constituent unit derived from each monomer [mol %]

[Synthesis of Amidine-Based Cationic Polymer (B)]
(Manufacturing Example 13)

A mixture of 6 g of a mixture of AN and NVF (a molar ratio of 55:45) and 34 g of distilled water was put into a four-necked flask having an inner volume of 50 mL in which a stirrer, a nitrogen introduction pipe, and a cooling pipe were provided. After that, a temperature rose to 60° C. while performing stirring in nitrogen gas, 0.12 g of V-50 was added, and retention was performed at 60° C. for 3 hours, and thus, a suspended matter in which the polymer was precipitated in water was obtained. 20 g of distilled water was added to the suspended matter, 1 equivalent of a concentrated hydrochloric acid was added to a formyl group of the polymer, and retention was performed at 100° C. for 4 hours, and thus, a yellow high-viscosity liquid was obtained. The yellow high-viscosity liquid was added into a large amount of acetone, the polymer was precipitated, an obtained polymer gel was shredded, and drying was performed overnight at 60° C., and then, pulverization was performed, and thus, the amidine-based cationic polymer (B) (a polymer B-1) was obtained.

The polymer B-1 was dissolved in heavy water, and a $^{13}$C-NMR spectrum was measured by an NMR spectrometer (manufactured by JEOL Ltd., 270 MHz). The composition of each of the constituent units was calculated from an integral value of peaks corresponding to each repeating unit of the $^{13}$C-NMR spectrum. The constituent units represented in General Formula (2) and General Formula (3) described above were obtained as a total amount without being discriminated. The results are shown in Table 2.

TABLE 2

| | Constituent unit* | Composition [mol %] | Reduced viscosity [ηsp/C] | Note |
|---|---|---|---|---|
| Manufacturing Example 13 Polymer B-1 | Amidine | 52.0 | 4.5 | Modified hydrochloric acid of polymeric matter of AN/NVF = 55/45 mol % |
| | NVF | 1.6 | | |
| | AN | 22.4 | | |
| | VAM | 24.0 | | |

*Amidine: Amidine hydrochloride constituent unit, NVF: N-Vinyl formamide constituent unit, AN: Acrylonitrile constituent unit, and VAM: Vinyl amine hydrochloride constituent unit

[Preparation of Polymer Coagulant]

Manufacturing Examples 14 and 15

The polymers shown in Table 1 and Table 2 were mixed and prepared at each mixing ratio shown in Table 3, and thus, the polymer coagulant (blends 1 and 2) shown in Table 3 was obtained.

TABLE 3

| | Polymer blend | Polymer used in blend | Ratio of each polymer with respect to total mass of polymer coagulant [mass %/mass %] | Polymer coagulant total cationic constituent unit [mol %] |
|---|---|---|---|---|
| Manufacturing Example 14 | Blend 1 | A-3/B-1 | 75/25 | 49.0 |
| Manufacturing Example 15 | Blend 2 | A-1/B-1 | 30/70 | 59.2 |

[Measurement of pH of Organic Wastewater]
pH of the organic wastewater was measured by a measurement method of pH described in JS K 0102:13.
[Measurement of TS in Organic Wastewater]
TS in the organic wastewater was measured by the measurement method of TS described above.
[Measurement of SS in Organic Wastewater]
SS in the organic wastewater was measured by the measurement method of SS described above.
[Measurement of Colloid Value (Supernatant) of Organic Wastewater]
The colloid value (the supernatant) of the organic wastewater was measured by the measurement method of the colloid value described above.
[Measurement of Colloid Value (Whole) of Organic Wastewater]
The colloid value (the whole) of the organic wastewater was measured by the measurement method of the colloid value described above.
[Measurement of SVI3000 of Organic Wastewater]
SVI3000 of the organic wastewater was measured by the measurement method of SVI3000 described above.
[Measurement of Electrical Conductivity of Organic Wastewater]
The electrical conductivity of the organic wastewater was measured by the measurement method of the electrical conductivity described above.
[Measurement of Phosphorus Compound (T-P1 and T-P2') in Organic Wastewater and Separated Water]
The phosphorus compound (T-P1 and T-P2') in the organic wastewater and the separated water was measured by a measurement method of a total phosphorus concentration using a potassium peroxydisulfate decomposition method and a molybdenum blue absorptiometric method.

[Measurement of COD (Mn) in Organic Wastewater and Separated Water]

COD (Mn) in the organic wastewater and the separated water was measured by a measurement method of COD (Mn) described in JIS K 0102:17.

[Measurement of Minus Charge Ratio in Organic Wastewater]

The minus charge ratio in the organic wastewater was measured by the measurement method of the minus charge ratio described above.

[Measurement of Organic Body Nitrogen Component (Org-N1 and Org-N2') in Organic Wastewater and Separated Water]

The organic body nitrogen component (Org-N1 and Org-N2') in the organic wastewater and the separated water was measured by a measurement method of a protein concentration using the Bradford method.

[Organic Body Nitrogen Component/SS in Organic Wastewater]

Organic Body Nitrogen Component/SS in the organic wastewater was obtained by using the following numerical expression.

$$\text{Organic Body Nitrogen Component}/SS(\%) = \left( \frac{\text{Organic Body Nitrogen Component(mg/l)}}{SS \text{ in Organic Wastewater}(\%) \times 10{,}000} \right) \times 100 \quad (17)$$

Examples 1 to 32 and Comparative Examples 1 and 2)

[Used Organic Wastewater]

The field, the type, and the properties of the organic wastewater used in the examples and the comparative examples are shown in Tables 4 and 5.

TABLE 4

| Notation | Field | Type | pH | TS (%) | SS (%) | Colloid value (supernatant) (meq/l) | Colloid value (whole) (meq/l) | SVI3000 (ml/g) |
|---|---|---|---|---|---|---|---|---|
| Wastewater 1 | Livestock | Biomass | 8.02 | 3.37 | 2.37 | −5.25 | −10.35 | 15.2 |
| Wastewater 2 | Livestock | Mixed sludge | 7.54 | 2.91 | 1.22 | −5.38 | −9.25 | 8.7 |
| Wastewater 3 | Sewage | Digestive sludge | 7.74 | 1.64 | 1.38 | −1.50 | −7.90 | 19.2 |
| Wastewater 4 | Sewage | Biomass Sludge | 8.21 | 2.18 | 1.26 | −2.75 | −8.75 | 6.4 |
| Wastewater 5 | Livestock | Mixed sludge | 6.56 | 4.73 | 3.33 | −3.50 | −10.10 | 7.5 |
| Wastewater 6 | Sewage | Mixed sludge | 5.43 | 2.26 | 1.95 | −0.15 | −6.70 | 16.2 |
| Wastewater 7 | Sewage | Digestive sludge | 7.76 | 2.17 | 1.75 | −2.57 | −10.20 | 16.2 |
| Wastewater 8 | Livestock | Biomass | 7.77 | 4.03 | 3.13 | −9.88 | −18.50 | 12.1 |
| Wastewater 9 | Livestock | Biomass | 8.26 | 3.34 | 2.43 | −5.25 | −10.35 | 9.8 |
| Wastewater 10 | Livestock | Biomass Sludge | 8.36 | 2.67 | 1.96 | −7.00 | −15.05 | 10.4 |
| Wastewater 11 | Livestock | Mixed sludge | 6.66 | 2.70 | 1.65 | −1.90 | −7.15 | 10.4 |
| Wastewater 12 | Livestock | Biomass | 7.90 | 3.67 | 2.76 | −8.25 | −16.05 | 13.7 |
| Wastewater 13 | Livestock | Biomass Sludge | 8.28 | 3.16 | 2.18 | −8.50 | −10.35 | 13.5 |
| Wastewater 14 | Livestock | Biomass | 8.35 | 3.18 | 2.29 | −7.00 | −10.25 | 13.8 |
| Wastewater 15 | Livestock | Biomass | 7.85 | 5.27 | 4.48 | −12.25 | −25.09 | 10.3 |
| Wastewater 16 | Livestock | Biomass | 7.78 | 4.42 | 3.33 | −8.25 | −10.20 | 11.3 |
| Wastewater 17 | Food | Mixed sludge | 8.20 | 4.25 | 3.50 | −6.00 | −24.00 | 10.9 |
| Wastewater 18 | Livestock | Mixed sludge | 7.06 | 1.33 | 0.53 | −0.63 | −1.80 | 6.0 |
| Wastewater 19 | Human waste | Surplus sludge | 5.76 | 1.38 | 1.19 | −0.88 | −7.05 | 32.2 |
| Wastewater 20 | Food | Mixed sludge | 8.60 | 9.50 | 8.00 | −12.00 | −50.00 | 13.9 |
| Wastewater 21 | Sewage | Digestive sludge | 7.62 | 2.15 | 1.77 | −1.68 | −11.00 | 27.7 |

TABLE 5

| Notation | Field | Type | Electrical conductivity (mS/cm) | Phosphorus compound (mg/l) | COD (Mn) (mg/l) | Minus charge ratio | Organic body nitrogen component (mg/l) | Organic body nitrogen/ SS (%) |
|---|---|---|---|---|---|---|---|---|
| Wastewater 1 | Livestock | Biomass | 12.7 | 332 | 11600 | 2.02 | 1583 | 6.7 |
| Wastewater 2 | Livestock | Mixed sludge | 8.7 | 240 | 12000 | 0.94 | 1328 | 10.9 |
| Wastewater 3 | Sewage | Digestive sludge | 6.5 | 140 | 6200 | 1.54 | 887 | 6.4 |
| Wastewater 4 | Sewage | Biomass Sludge | 19.9 | 375 | 7930 | 0.60 | 1240 | 9.8 |
| Wastewater 5 | Livestock | Mixed sludge | 15.4 | 474 | 9700 | 1.02 | 3020 | 9.1 |
| Wastewater 6 | Sewage | Mixed sludge | 2.2 | 1220 | 7920 | 0.20 | 1530 | 7.8 |
| Wastewater 7 | Sewage | Digestive sludge | 7.9 | 500 | 8900 | 1.67 | 1435 | 8.2 |
| Wastewater 8 | Livestock | Biomass | 16.7 | 600 | 19600 | 2.58 | 3690 | 11.8 |
| Wastewater 9 | Livestock | Biomass | 13.2 | 163 | 6590 | 1.86 | 1910 | 7.9 |
| Wastewater 10 | Livestock | Biomass Sludge | 13.2 | 572 | 9200 | 1.78 | 2035 | 10.4 |

TABLE 5-continued

| Notation | Field | Type | Electrical conductivity (mS/cm) | Phosphorus compound (mg/l) | COD (Mn) (mg/l) | Minus charge ratio | Organic body nitrogen component (mg/l) | Organic body nitrogen/ SS (%) |
|---|---|---|---|---|---|---|---|---|
| Wastewater 11 | Livestock | Mixed sludge | 6.3 | 600 | 6200 | 0.69 | 1440 | 8.7 |
| Wastewater 12 | Livestock | Biomass | 9.5 | 534 | 13600 | 2.35 | 1860 | 6.7 |
| Wastewater 13 | Livestock | Biomass Sludge | 16.3 | 470 | 12000 | 2.99 | 2880 | 13.2 |
| Wastewater 14 | Livestock | Biomass | 11.4 | 483 | 13200 | 2.78 | 1870 | 8.2 |
| Wastewater 15 | Livestock | Biomass | 10.6 | 885 | 15800 | 3.33 | 2710 | 6.0 |
| Wastewater 16 | Livestock | Biomass | 9.3 | 638 | 21000 | 3.46 | 2290 | 6.9 |
| Wastewater 17 | Food | Mixed sludge | 4.3 | 120 | 23000 | 1.47 | 15000 | 42.9 |
| Wastewater 18 | Livestock | Mixed sludge | 6.5 | 320 | 2850 | 0.45 | 258 | 4.9 |
| Wastewater 19 | Human waste | Surplus sludge | 1.5 | 279 | 3200 | 1.37 | 692 | 5.8 |
| Wastewater 20 | Food | Mixed sludge | 4.6 | 140 | 47000 | 1.73 | 47000 | 58.8 |
| Wastewater 21 | Sewage | Digestive sludge | 7.8 | 860 | 7600 | 1.25 | 660 | 3.7 |

[Coagulation Test]

First, 300 ml of the organic wastewater was sampled into a beaker of 500 ml. Next, 0.3% of each of the polymers shown in Tables 1 to 3 was dissolved, and thus, an aqueous solution of the polymer coagulant was prepared, and the aqueous solution of the polymer coagulant was added at a concentration shown in Tables 6 and 7, and then, the coagulation flock was formed by performing stirring and mixing with a spatula, under a condition of a stirring rate of 180 rotations/minute and a stirring time of 60 seconds. After that, the coagulation flock was precipitated, and the coagulation flock and the separated water were separated from each other. Further, the coagulation flock was subjected to press dewatering at a pressure of 0.1 MPa for 60 seconds, and thus, a dewatered cake was obtained.

[Moisture Content of Dewatered Cake]

A moisture content of the dewatered cake that was obtained in the coagulation test was measured. The measurement of the moisture content was performed on the basis of "Sewer Drain Test Method, Part 1, Published in 1997" p296-297 of JAPAN SEWAGE WORKS ASSOCIATION.

[Evaluation Method]

[Coagulation Flock Particle Diameter, SS in Separated Water, COD (Mn) in Separated Water, Organic Body Nitrogen Component (Org-N2') in Separated Water, and Phosphorus Compound (T-P2') in Separated Water]

In each of the examples, stirring was stopped after the coagulation flock was formed, and a coagulation flock particle diameter was visually measured. After that, the separated water was sampled, and SS in the separated water, COD (Mn) in the separated water, the organic body nitrogen component (Org-N2') in the separated water, and the phosphorus compound (T-P2') in the separated water were measured.

[Separating Test of Phosphorus Compound Using Acid Treatment]

The dewatered cake obtained in the coagulation test of each of the examples shown in Tables 6 to 8 was recovered as the separated solid content. The separated solid content was put into a beaker of 500 ml, a hydrochloric acid having a concentration of 0.1 mol/1 was added, adjustment was performed such that a sum volume of the coagulation flock and the hydrochloric acid became 300 ml, and immersion was performed for 30 minutes while performing stirring and mixing at 500 rpm by using a magnetic stirrer. After that, centrifugal separation was performed at 3600 rpm for 5 minutes, and the separated solid content after the acid treatment with the acid immersion water was separated. After that, the acid immersion water was recovered, and the phosphorus compound (T-P3) in the acid immersion water was measured.

[SS Recovery Rate]

An SS recovery rate was obtained from SS in the organic wastewater and the separated water that was measured in each of the examples by using the following numerical expression.

[Expression 20]

$$SS \text{ Recovery Rate}(\%) = \left(1 - \frac{SS \text{ in Separated Water}}{SS \text{ in Organic Wastewater}}\right) \times 100 \quad (18)$$

[COD (Mn) Removal Rate]

A COD (Mn) removal rate was obtained from COD (Mn) in the organic wastewater and the separated water that was measured in each of the examples by using the following numerical expression.

[Expression 21]

$$COD(Mn) \text{ Removal Rate}(\%) = \left(1 - \frac{COD(Mn) \text{ in Separated Water}}{COD(Mn) \text{ in Organic Wastewater}}\right) \times 100 \quad (19)$$

[Adsorption Rate of Organic Body Nitrogen Component]

The adsorption rate of the organic body nitrogen component was obtained from the organic body nitrogen component (Org-N1 and Org-N2') in the organic wastewater and the separated water that was measured in each of the examples by using Numerical Expression (9) described above.

[Adsorption Rate of Phosphorus Compound]

The adsorption rate of the phosphorus compound was obtained from the phosphorus compound (T-P1 and T-P2') in the organic wastewater and the separated water that was measured in each of the examples by using Numerical Expression (10) described above.

[Residual Rate of Organic Body Nitrogen Component]

The residual rate of the organic body nitrogen component was obtained from the organic body nitrogen component (Org-N1 and Org-NT) in the organic wastewater and the separated water that was measured in each of the examples by using Numerical Expression (11) described above.

[Residual Rate of Phosphorus Compound]

The residual rate of the phosphorus compound was obtained from the phosphorus compound (T-P1 and T-P2') in the organic wastewater and in the separated water that was measured in each of the examples by using Numerical Expression (12) described above.

[Recovery Rate of Phosphorus Compound]

The recovery rate of the phosphorus compound was obtained from the phosphorus compound (T-P1 and T-P3) in the organic wastewater and the separated water that was measured in each of the examples by using Numerical Expression (13) described above.

TABLE 6

| Example | Organic wastewater | Minus charge ratio | Polymer coagulant Brand | Total cationic constituent unit [mol %] | Adding rate (%/TS) |
|---|---|---|---|---|---|
| Example 1 | Wastewater 1 | 2.02 | Polymer A-2 | 30.0 | 2.5 |
| Example 2 | Wastewater 2 | 0.94 | Polymer A-4 | 50.0 | 2.0 |
| Example 3 | Wastewater 3 | 1.54 | Polymer A-5 | 60.0 | 1.5 |
| Example 4 | Wastewater 4 | 0.60 | Polymer A-5 | 60.0 | 2.5 |
| Example 5 | Wastewater 5 | 1.02 | Polymer A-6 | 80.0 | 1.5 |
| Example 6 | Wastewater 6 | 0.20 | Polymer A-7 | 87.4 | 1.5 |
| Example 7 | Wastewater 2 | 0.94 | Blend 1 | 49.0 | 2.0 |
| Example 8 | Wastewater 5 | 1.02 | Blend 2 | 59.2 | 1.5 |
| Example 9 | Wastewater 7 | 1.67 | Polymer A-1 | 20.0 | 2.5 |
| Example 10 | Wastewater 5 | 1.02 | Polymer A-2 | 30.0 | 1.5 |
| Example 11 | Wastewater 8 | 2.58 | Polymer A-3 | 40.0 | 2.5 |
| Example 12 | Wastewater 9 | 1.86 | Polymer A-4 | 50.0 | 2.5 |
| Example 13 | Wastewater 6 | 0.20 | Polymer A-6 | 80.0 | 1.5 |
| Example 14 | Wastewater 3 | 1.54 | Polymer A-7 | 87.4 | 1.5 |
| Example 15 | Wastewater 10 | 1.78 | Polymer A-7 | 87.4 | 1.5 |

TABLE 7

| Example | Organic wastewater | Minus charge ratio | Polymer coagulant Brand | Total cationic constituent unit [mol %] | Adding rate (%/TS) |
|---|---|---|---|---|---|
| Example 16 | Wastewater 11 | 0.69 | Polymer A-9 | 100.0 | 2.5 |
| Example 17 | Wastewater 6 | 0.20 | Polymer B-1 | 100.0 | 1.5 |
| Example 18 | Wastewater 12 | 2.35 | Polymer A-1 | 20.0 | 2.5 |
| Example 19 | Wastewater 13 | 2.99 | Polymer A-1 | 20.0 | 1.8 |
| Example 20 | Wastewater 14 | 2.78 | Polymer A-3 | 40.0 | 2.5 |
| Example 21 | Wastewater 15 | 3.33 | Polymer A-3 | 40.0 | 2.5 |
| Example 22 | Wastewater 4 | 0.60 | Polymer A-3 | 40.0 | 2.5 |
| Example 23 | Wastewater 6 | 0.20 | Polymer A-5 | 60.0 | 1.5 |
| Example 24 | Wastewater 5 | 1.02 | Polymer A-8 | 92.0 | 1.5 |
| Example 25 | Wastewater 16 | 3.46 | Polymer A-3 | 40.0 | 2.5 |
| Example 26 | Wastewater 13 | 2.99 | Polymer a-1 | 10.0 | 1.8 |
| Example 27 | Wastewater 5 | 1.02 | Polymer A-1 | 20.0 | 1.5 |
| Example 28 | Wastewater 13 | 2.99 | Polymer a-2 | 8.0 | 1.5 |
| Example 29 | Wastewater 13 | 2.99 | Polymer a-3 | 4.0 | 1.5 |
| Example 30 | Wastewater 17 | 1.47 | Polymer A-5 | 60.0 | 2.0 |
| Example 31 | Wastewater 18 | 0.45 | Polymer A-7 | 87.4 | 1.5 |
| Example 32 | Wastewater 19 | 1.37 | Polymer A-1 | 20.0 | 1.8 |
| Comparative Example 1 | Wastewater 20 | 1.73 | Polymer A-5 | 60.0 | 3.0 |
| Comparative Example 2 | Wastewater 21 | 1.25 | Polymer A-3 | 40.0 | 1.5 |

TABLE 8

| Example | Coagulation flock particle diameter (mm) | SS recovery rate (%) | COD (Mn) removal rate (%) | Moisture content of dewatered cake (%) | Adsorption rate of organic body nitrogen component (%) | Adsorption rate of phosphorus compound (%) | Residual rate of organic body nitrogen component (%) | Residual rate of phosphorus compound (%) |
|---|---|---|---|---|---|---|---|---|
| Example 1 | 5.0 | 97 | 83 | 78.9 | 89 | 85 | 11 | 15 |
| Example 2 | 3.5 | 98 | 82 | 78.5 | 88 | 85 | 12 | 15 |
| Example 3 | 5.0 | 99 | 82 | 81.2 | 88 | 83 | 12 | 17 |
| Example 4 | 3.0 | 96 | 82 | 83.2 | 79 | 79 | 21 | 21 |
| Example 5 | 4.0 | 99 | 84 | 74.3 | 87 | 84 | 13 | 16 |

TABLE 8-continued

| Example | Coagulation flock particle diameter (mm) | SS recovery rate (%) | COD (Mn) removal rate (%) | Moisture content of dewatered cake (%) | Adsorption rate of organic body nitrogen component (%) | Adsorption rate of phosphorus compound (%) | Residual rate of organic body nitrogen component (%) | Residual rate of phosphorus compound (%) |
|---|---|---|---|---|---|---|---|---|
| Example 6 | 3.0 | 98 | 81 | 77.6 | 86 | 82 | 14 | 18 |
| Example 7 | 3.5 | 98 | 82 | 78.7 | 88 | 85 | 12 | 15 |
| Example 8 | 3.5 | 99 | 84 | 74.7 | 88 | 85 | 12 | 15 |
| Example 9 | 4.5 | 95 | 80 | 81.0 | 83 | 82 | 17 | 18 |
| Example 10 | 2.0 | 93 | 77 | 78.5 | 79 | 78 | 21 | 22 |
| Example 11 | 4.5 | 94 | 74 | 79.2 | 78 | 78 | 22 | 22 |
| Example 12 | 4.5 | 93 | 77 | 79.5 | 79 | 79 | 21 | 21 |
| Example 13 | 3.0 | 93 | 76 | 81.8 | 79 | 78 | 21 | 22 |
| Example 14 | 4.0 | 93 | 76 | 83.4 | 79 | 78 | 21 | 22 |
| Example 15 | 1.0 | 92 | 76 | 84.7 | 78 | 78 | 22 | 22 |
| Example 16 | 4.0 | 93 | 77 | 80.4 | 75 | 79 | 25 | 21 |
| Example 17 | 2.5 | 94 | 76 | 81.2 | 75 | 79 | 25 | 21 |
| Example 18 | 3.0 | 94 | 76 | 79.3 | 88 | 83 | 12 | 17 |
| Example 19 | 6.0 | 93 | 73 | 81.3 | 79 | 79 | 21 | 21 |
| Example 20 | 3.0 | 90 | 70 | 79.3 | 68 | 72 | 32 | 28 |
| Example 21 | 3.0 | 90 | 71 | 79.5 | 68 | 71 | 32 | 29 |
| Example 22 | 3.0 | 89 | 71 | 82.1 | 69 | 72 | 31 | 28 |
| Example 23 | 2.0 | 89 | 70 | 78.3 | 68 | 72 | 32 | 28 |
| Example 24 | 2.0 | 92 | 75 | 78.9 | 78 | 79 | 22 | 21 |
| Example 25 | 2.5 | 86 | 70 | 82.3 | 67 | 71 | 33 | 29 |
| Example 26 | 3.0 | 89 | 72 | 82.5 | 78 | 79 | 22 | 21 |
| Example 27 | 2.0 | 88 | 68 | 79.5 | 67 | 72 | 33 | 28 |
| Example 28 | 2.0 | 83 | 66 | 80.5 | 78 | 79 | 22 | 21 |
| Example 29 | 2.0 | 82 | 66 | 81.2 | 73 | 77 | 27 | 23 |
| Example 30 | 4.0 | 83 | 67 | 84.3 | 59 | 64 | 41 | 36 |
| Example 31 | 4.0 | 86 | 66 | 76.6 | 58 | 65 | 42 | 35 |
| Example 32 | 4.0 | 83 | 63 | 85.7 | 57 | 63 | 43 | 37 |
| Comparative Example 1 | 0.5 | 62 | 54 | 87.2 | 49 | 53 | 51 | 47 |
| Comparative Example 2 | 2.0 | 86 | 59 | 85.7 | 44 | 51 | 56 | 49 |

As shown in Tables 6 to 8, in Examples 1 to 32 where the treatment using the treatment method for organic wastewater according to the invention was performed with respect to the organic wastewater within a range to be treated by the treatment method for organic wastewater according to the invention, the coarse coagulation flock was formed, the SS recovery rate and the COD (Mn) removal rate were high, and high-quality separated water was obtained. In addition, the adsorption rate of the organic body nitrogen component and the phosphorus compound was high, the residual rate of the organic body nitrogen component and the phosphorus compound was low, and excellent separating performance of the organic body nitrogen component and the phosphorus compound was exhibited.

In addition, in Examples 1 to 29 where the treatment using the treatment method for organic wastewater according to the invention was performed with respect to the organic wastewater where the range of the organic body nitrogen component with respect to SS in the organic wastewater was within a range of greater than or equal to 6%/SS and less than or equal to 40%/SS, a more excellent value was obtained in the SS recovery rate, the COD (Mn) removal rate, and the adsorption rate of the organic body nitrogen component and the phosphorus compound.

Figure 2:
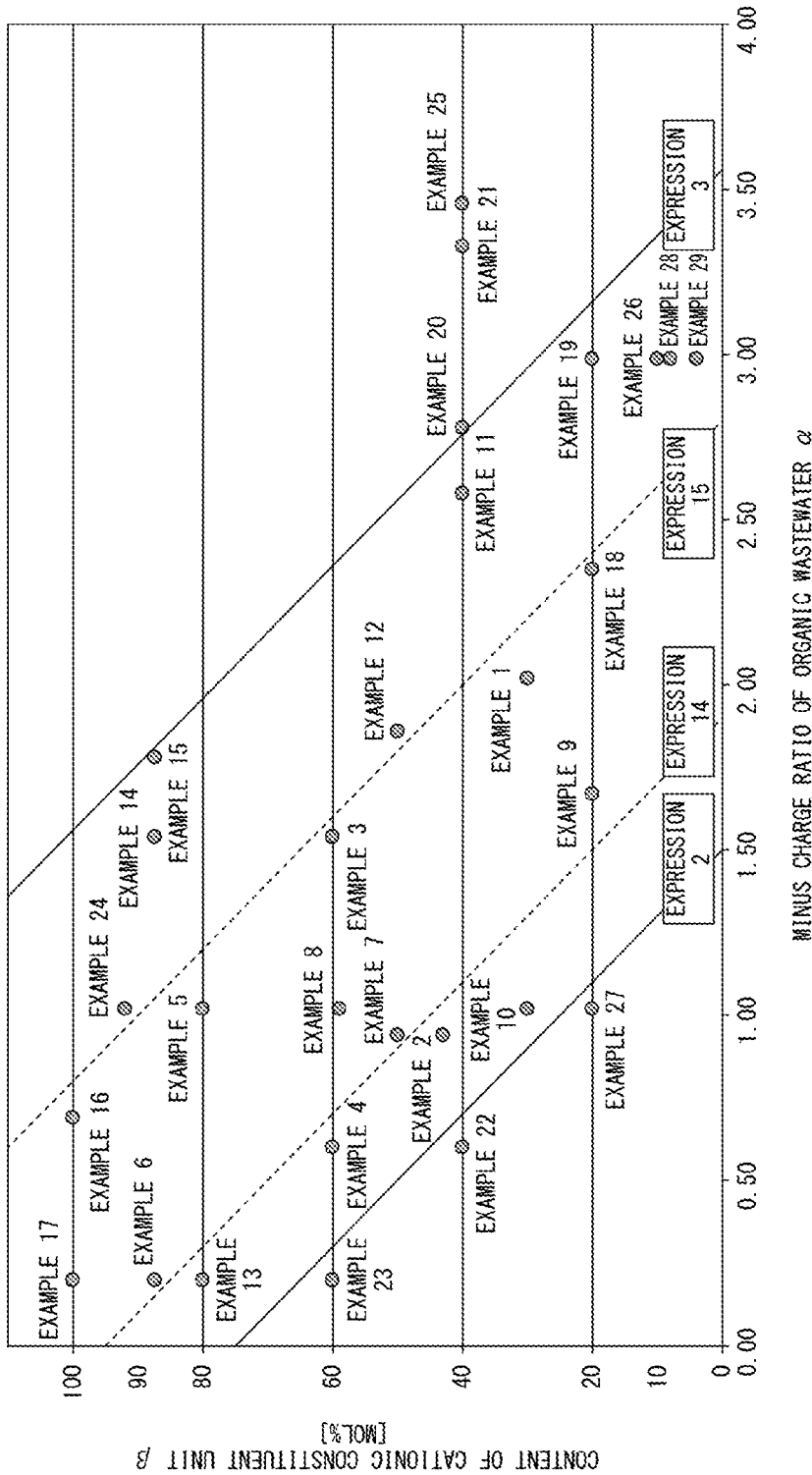
FIG. 2 is a diagram illustrating a mutual relationship between a minus charge ratio α of organic wastewater and a mole percentage p of a cationic constituent unit with respect to a sum of all constituent units of each polymer material configuring a polymer coagulant (X) in Examples 1 to 29.

Table 9 shows the relationship between the minus charge ratio α of the organic wastewater and the mole percentage β of the cationic constituent unit with respect to the sum of all of the constituent units of each of the polymer materials configuring the polymer coagulant (X), and FIG. 2 illustrates Table 9 in a graph. As illustrated in FIG. 2, in Examples 1 to 19, 24, 26, 28, and 29 where the treatment was performed in a condition where the range of the minus charge ratio α of the organic wastewater and the mole percentage β of the cationic constituent unit with respect to the sum of all of the constituent units of each of the polymer materials configuring the polymer coagulant (X) satisfies the relationship of Numerical Expression (2) described above and Numerical Expression (3) described above, in particular, the adsorption rate of the organic body nitrogen component and the phosphorus compound was high, the residual rate of the organic body nitrogen component and the phosphorus compound was low, and excellent separating performance of the organic body nitrogen component and the phosphorus compound was exhibited.

TABLE 9

| | | | Polymer coagulant | |
|---|---|---|---|---|
| Example | Organic wastewater | Minus charge ratio | Brand | Total cationic constituent unit [mol %] |
| Example 1 | Wastewater 1 | 2.02 | Polymer A-2 | 30 |
| Example 2 | Wastewater 2 | 0.94 | Polymer A-4 | 50 |
| Example 3 | Wastewater 3 | 1.54 | Polymer A-5 | 60 |
| Example 4 | Wastewater 4 | 0.60 | Polymer A-5 | 60 |
| Example 5 | Wastewater 5 | 1.02 | Polymer A-6 | 80 |
| Example 6 | Wastewater 6 | 0.20 | Polymer A-7 | 87.4 |
| Example 7 | Wastewater 2 | 0.94 | Blend 1 | 43 |
| Example 8 | Wastewater 5 | 1.02 | Blend 2 | 59 |
| Example 9 | Wastewater 7 | 1.67 | Polymer A-1 | 20 |
| Example 10 | Wastewater 5 | 1.02 | Polymer A-2 | 30 |
| Example 11 | Wastewater 8 | 2.58 | Polymer A-3 | 40 |
| Example 12 | Wastewater 9 | 1.86 | Polymer A-4 | 50 |

TABLE 9-continued

| Example | Organic wastewater | Minus charge ratio | Polymer coagulant Brand | Total cationic constituent unit [mol %] |
|---|---|---|---|---|
| Example 13 | Wastewater 6 | 0.20 | Polymer A-6 | 80 |
| Example 14 | Wastewater 3 | 1.54 | Polymer A-7 | 87.4 |
| Example 15 | Wastewater 10 | 1.78 | Polymer A-7 | 87.4 |
| Example 16 | Wastewater 11 | 0.69 | Polymer A-9 | 100 |
| Example 17 | Wastewater 6 | 0.20 | Polymer B-1 | 100 |
| Example 18 | Wastewater 12 | 2.35 | Polymer A-1 | 20 |
| Example 19 | Wastewater 13 | 2.99 | Polymer A-1 | 20 |
| Example 20 | Wastewater 14 | 2.78 | Polymer A-3 | 40 |
| Example 21 | Wastewater 15 | 3.33 | Polymer A-3 | 40 |
| Example 22 | Wastewater 4 | 0.60 | Polymer A-3 | 40 |
| Example 23 | Wastewater 6 | 0.20 | Polymer A-5 | 60 |
| Example 24 | Wastewater 5 | 1.02 | Polymer A-8 | 92 |
| Example 25 | Wastewater 16 | 3.46 | Polymer A-3 | 40 |
| Example 26 | Wastewater 13 | 2.99 | Polymer a-1 | 10 |
| Example 27 | Wastewater 5 | 1.02 | Polymer A-1 | 20 |
| Example 28 | Wastewater 13 | 2.99 | Polymer a-2 | 8 |
| Example 29 | Wastewater 5 | 2.99 | Polymer a-3 | 4 |
| Comparative Example 1 | Wastewater 20 | 1.73 | Polymer A-5 | 60 |
| Comparative Example 2 | Wastewater 21 | 1.25 | Polymer A-3 | 40 |

In contrast, Comparative Examples 1 and 2 were a result of performing the treatment using the treatment method for organic wastewater according to the invention with respect to organic wastewater other than the organic wastewater within the range to be treated by the treatment method for organic wastewater according to the invention, and in Comparative Examples 1 and 2, the SS recovery rate and the COD (Mn) removal rate were low. In addition, the adsorption rate of the organic body nitrogen component and the phosphorus compound was low, the residual rate of the organic body nitrogen component and the phosphorus compound was high, and excellent separating performance of the organic body nitrogen component and the phosphorus compound was not capable of being confirmed.

TABLE 10

| Example | Recovery rate of phosphorus compound (%) |
|---|---|
| Example 1 | 82 |
| Example 2 | 82 |
| Example 3 | 81 |
| Example 4 | 70 |
| Example 5 | 81 |
| Example 6 | 80 |
| Example 7 | 82 |
| Example 11 | 69 |
| Example 12 | 68 |
| Example 15 | 67 |
| Example 16 | 63 |
| Example 21 | 50 |
| Example 25 | 50 |
| Example 26 | 68 |
| Example 28 | 67 |
| Example 29 | 64 |
| Comparative Example 1 | 17 |

As shown in Table 10, in Examples 1 to 7, 11, 12, 15, 21, 25, 26, 28, and 29 where the treatment using the treatment method for organic wastewater according to the invention was performed with respect to the organic wastewater within the range to be treated by the treatment method for organic wastewater according to the invention, the recovery rate of the phosphorus compound was high, and excellent recovery performance of the phosphorus compound was exhibited. On the other hand, Comparative Example 1 is a result of performing the treatment using the treatment method for organic wastewater according to the invention with respect to the organic wastewater other than the organic wastewater within the range to be treated by the treatment method for organic wastewater according to the invention, and in Comparative Example 1, the recovery rate of the phosphorus compound was low, and a sufficient recovery effect of the phosphorus compound was not capable of being confirmed.

INDUSTRIAL APPLICABILITY

According to treatment method for organic wastewater of the invention, in the coagulation treatment of the organic wastewater, the coagulation flock containing a large amount of organic body nitrogen component is excellently formed by adding and mixing the polymer coagulant without performing a complicated pre-treatment. For this reason, it is possible to efficiently separate and recover the organic body nitrogen component or the phosphorus compound in the organic wastewater, and to use the organic body nitrogen component or the phosphorus compound that is separated and recovered as a fodder or a fertilizer. In addition, SS, BOD, COD, and the nitrogen component in the separated water are greatly reduced, and thus, the separated water of high water quality is obtained.

The invention claimed is:

1. A treatment method for organic wastewater, comprising:
adding a polymer coagulant into a volume of organic wastewater in which an organic body nitrogen component is greater than or equal to 4%/SS and less than or equal to 50%/SS with respect to a suspended solid (SS), and the organic body nitrogen component is greater than or equal to 250 mg/L and less than or equal to 30,000 mg/L to form a flock; and
separating the flock from the organic wastewater by performing solid-liquid separation,
wherein SS and the organic body nitrogen component with respect to the SS are calculated by the following equations:

$$SS = \frac{\text{Precipitate solid content amount } C[\text{g}]}{\text{Organic Wastewater [ml]}} \times 100(\%)$$

and $$\frac{\text{Organic Body Nitrogen Component [mg/l]}}{SS \text{ in Organic Wastewater } (\%) \times 10{,}000} \times 100,$$

wherein a minus charge ratio in the organic wastewater that is obtained by Numerical Expression (1) described below is greater than or equal to 0.01 and less than or equal to 3.4,

[Expression 1]

Minus Charge Ratio = (1)
$$\frac{\text{Colloid Value (Supernatant)}}{\text{Colloid Value (Whole)}} \times \frac{\text{TS}}{\text{TS} - \text{SS}} \times \log_{10} SVI3000$$

(in Numerical Expression (1), a colloid value (a supernatant) (meq/l) represents a charge amount contained in a supernatant liquid that is obtained by performing centrifugal separation with respect to the organic wastewater at 3000 rpm for 5 minutes, a colloid value (a whole) (meq/l) represents a charge amount contained in the organic wastewater, and SVI3000 (ml/g) represents a specific volume of a precipitate that is obtained by performing centrifugal separation with respect to the organic wastewater at 3000 rpm for 5 minutes), wherein the polymer coagulant is a polymer coagulant (X) formed of polymer materials having at least one type of cationic constituent unit, and a content of the cationic constituent unit with respect to a sum of all constituent units of each of the polymer materials configuring the polymer coagulant (X) is greater than or equal to 8 mol % and less than or equal to 80 mol %, and wherein in a case where the minus charge ratio in the organic wastewater is set to α, and the content of the cationic constituent unit with respect to the sum of all of the constituent units of each of the polymer materials configuring the polymer coagulant (X) is set to β mol %, α and β satisfy a relationship represented by Numerical Expression (2) described below and Numerical Expression (3) described below:

[Expression 2]

$$\beta \geq -50 \times \alpha + 75 \quad (2)$$

[Expression 3]

$$\beta \leq -50 \times \alpha + 178 \quad (3).$$

2. The treatment method for organic wastewater according to claim 1, wherein the organic body nitrogen component is greater than or equal to 6%/SS and less than or equal to 40%/SS with respect to the suspended solid (SS) in the organic wastewater.

3. The treatment method for organic wastewater according to claim 1, wherein the organic wastewater contains an organic body nitrogen component, and the flock is a flock containing the organic body nitrogen component.

4. The treatment method for organic wastewater according to claim 3, wherein the organic body nitrogen component is separated and recovered from the flock.

5. The treatment method for organic wastewater according to claim 1, wherein the organic wastewater contains a phosphorus compound, and the flock is a flock containing the phosphorus compound.

6. The treatment method for organic wastewater according to claim 5, wherein the phosphorus compound is separated and recovered from the flock.

7. The treatment method for organic wastewater according to claim 1, wherein the flock that is obtained by performing the solid-liquid separation is subjected to an acid treatment.

8. The treatment method for organic wastewater according to claim 1, wherein the polymer coagulant (X) is a non-amidine-based cationic polymer (A) having a cationic constituent unit represented by General Formula (1) described below,

[Formula 1]

General Formula (1)

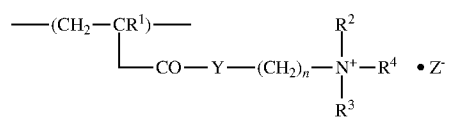

(in General Formula (1), $R^1$ represents a hydrogen atom or a methyl group, $R^2$ and $R^3$ each independently represent any one of a hydrogen atom and an alkyl group having 1 to 4 carbon atoms, $R^4$ represents an alkyl group having 1 to 4 carbon atoms or a benzyl group, Y represents an oxygen atom or NH, $Z^-$ represents a negative ion, and n represents an integer of 1 to 3).

9. The treatment method for organic wastewater according to claim 1, wherein the polymer coagulant (X) contains an amidine-based cationic polymer (B), the amidine-based cationic polymer (B) has at least one of amidine constituent units represented by General Formula (2) described below and General Formula (3) described below,

[Formula 2]

General Formula (2)

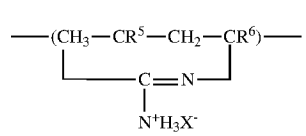

[Formula 3]

General Formula (3)

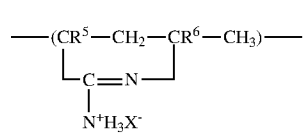

(in General Formula (2) and General Formula (3), $R^5$ and $R^6$ each independently represent any one of a hydrogen atom and a methyl group, and $X^-$ represents a negative ion).

10. A manufacturing method of a phosphorus compound, comprising:

adding a polymer coagulant into a volume of organic wastewater in which an organic body nitrogen component is greater than or equal to 4%/SS and less than or equal to 50%/SS with respect to a suspended solid (SS), and the organic body nitrogen component is greater than or equal to 250 mg/L and less than or equal to 30,000 mg/L, to form a flock;

separating the flock from the organic wastewater by performing solid-liquid separation; and separating the phosphorus compound from the flock, wherein SS and the organic body nitrogen component with respect to the SS are calculated by the following equations:

$$SS = \frac{\text{Precipitate solid content amount } C[\text{g}]}{\text{Organic Wastewater [ml]}} \times 100(\%)$$

and $$\frac{\text{Organic Body Nitrogen Component [mg/l]}}{SS \text{ in Organic Wastewater } (\%) \times 10,000} \times 100,$$

wherein a minus charge ratio in the organic wastewater that is obtained by Numerical Expression (1) described below is greater than or equal to 0.01 and less than or equal to 3.4,

[Expression 1]

$$\text{Minus Charge Ratio} = \frac{\text{Colloid Value (Supernatant)}}{\text{Colloid Value (Whole)}} \times \frac{\text{TS}}{\text{TS} - \text{SS}} \times \log_{10} SVI3000 \quad (1)$$

(in Numerical Expression (1), a colloid value (a supernatant) (meq/l) represents a charge amount contained in a supernatant liquid that is obtained by performing centrifugal separation with respect to the organic wastewater at 3000 rpm for 5 minutes, a colloid value (a whole) (meq/l) represents a charge amount contained in the organic wastewater, and SVI3000 (ml/g) represents a specific volume of a precipitate that is obtained by performing centrifugal separation with respect to the organic wastewater at 3000 rpm for 5 minutes), wherein the polymer coagulant is a polymer coagulant (X) formed of polymer materials having at least one type of cationic constituent unit, and a content of the cationic constituent unit with respect to a sum of all constituent units of each of the polymer materials configuring the polymer coagulant (X) is greater than or equal to 8 mol % and less than or equal to 80 mol %, and wherein in a case where the minus charge ratio in the organic wastewater is set to a, and the content of the cationic constituent unit with respect to the sum of all of the constituent units of each of the polymer materials configuring the polymer coagulant (X) is set to 13 mol %, a and 13 satisfy a relationship represented by Numerical Expression (2) described below and Numerical Expression (3) described below:

[Expression 2]

$$\beta \geq -50 \times \alpha + 75 \quad (2)$$

[Expression 3]

$$\beta \leq -50 \times \alpha + 178 \quad (3).$$

* * * * *